US008156435B2

(12) United States Patent
Wohlert

(10) Patent No.: US 8,156,435 B2
(45) Date of Patent: Apr. 10, 2012

(54) SYSTEMS AND METHODS TO SELECT MEDIA CONTENT

(75) Inventor: Randolph Wohlert, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 385 days.

(21) Appl. No.: 12/323,353

(22) Filed: Nov. 25, 2008

(65) Prior Publication Data

US 2010/0131844 A1    May 27, 2010

(51) Int. Cl.
*G06F 3/00*    (2006.01)
(52) U.S. Cl. ......... 715/716; 715/810; 715/833; 345/440
(58) Field of Classification Search ................... 715/716, 715/719–722, 727–731, 771, 772, 853–855, 715/810, 833; 345/440
See application file for complete search history.

(56) References Cited

U.S. PATENT DOCUMENTS

| | | | | |
|---|---|---|---|---|
| 5,616,876 | A * | 4/1997 | Cluts | 84/609 |
| 7,024,677 | B1 * | 4/2006 | Snyder et al. | 725/86 |
| 7,028,082 | B1 * | 4/2006 | Rosenberg et al. | 709/223 |
| 7,076,561 | B1 | 7/2006 | Rosenberg et al. | |
| 7,133,924 | B1 | 11/2006 | Rosenberg et al. | |
| 7,216,008 | B2 * | 5/2007 | Sakata | 700/94 |
| 7,279,629 | B2 * | 10/2007 | Hinman et al. | 84/615 |
| 7,320,025 | B1 * | 1/2008 | Steinberg et al. | 709/217 |
| 7,321,923 | B1 | 1/2008 | Rosenberg et al. | |
| 7,325,043 | B1 | 1/2008 | Rosenberg et al. | |
| 7,454,509 | B2 * | 11/2008 | Boulter et al. | 709/231 |
| 7,555,539 | B1 | 6/2009 | Rosenberg et al. | |
| 7,580,932 | B2 * | 8/2009 | Plastina et al. | 1/1 |
| 7,617,295 | B1 * | 11/2009 | Farber et al. | 709/217 |
| 7,627,605 | B1 * | 12/2009 | Lamere et al. | 1/1 |
| 7,650,570 | B2 * | 1/2010 | Torrens et al. | 715/727 |
| 7,668,936 | B1 * | 2/2010 | Krikorian et al. | 709/219 |
| 7,680,814 | B2 * | 3/2010 | Mercer et al. | 84/600 |

(Continued)

FOREIGN PATENT DOCUMENTS

WO    2004 107757 A1    12/2004

OTHER PUBLICATIONS

R. Rango et al, Inferring Similarity Between Music Objects with Application to Playlist Generation, Multimedia Information Retrieval, Nov. 10-11, 2005, Singapore.

(Continued)

*Primary Examiner* — Tuyetlien Tran
*Assistant Examiner* — Enrique Iturralde
(74) *Attorney, Agent, or Firm* — Toler Law Group, P.C.

(57) ABSTRACT

Systems and methods to select media content are provided. A particular method includes generating a media playlist based on user preference data and generating a user interface display. The user preference data indicates proportions of each of a plurality of categories of media content to be present in the media playlist. The user interface display presents the user preference data using adjustable bars. Each bar is associated with one of the categories of media content, and a dimension of each bar is associated with the proportion of the respective category of media content included in the media playlist. The method includes receiving user input adjusting the dimension of a first bar associated with a first category of the plurality of categories of media content. The method includes adjusting the proportion of the first category of media content included in the media playlist based on the user input.

21 Claims, 11 Drawing Sheets

U.S. PATENT DOCUMENTS

| | | | |
|---|---|---|---|
| 7,747,620 B2* | 6/2010 | Beaupre | 707/734 |
| 7,752,265 B2* | 7/2010 | Svendsen et al. | 709/205 |
| 7,774,706 B2* | 8/2010 | Sakai | 715/723 |
| 7,783,722 B1* | 8/2010 | Rosenberg et al. | 709/219 |
| 7,814,135 B1* | 10/2010 | Hempleman et al. | 707/621 |
| 7,827,110 B1* | 11/2010 | Wieder | 705/52 |
| 7,827,259 B2* | 11/2010 | Heller et al. | 709/223 |
| 7,840,691 B1* | 11/2010 | De Bonet et al. | 709/231 |
| 7,856,485 B2* | 12/2010 | Prager et al. | 709/219 |
| 7,884,274 B1* | 2/2011 | Wieder | 84/609 |
| 2002/0002039 A1 | 1/2002 | Qureshey et al. | |
| 2002/0040326 A1 | 4/2002 | Spratt | |
| 2003/0028505 A1 | 2/2003 | O'Rourke et al. | |
| 2005/0216855 A1 | 9/2005 | Kopra et al. | |
| 2006/0000345 A1* | 1/2006 | Yoshikawa | 84/616 |
| 2006/0028471 A1* | 2/2006 | Kincaid et al. | 345/440 |
| 2006/0112335 A1* | 5/2006 | Hofmeister et al. | 715/701 |
| 2007/0048714 A1 | 3/2007 | Plastina et al. | |
| 2007/0079352 A1 | 4/2007 | Klein | |
| 2007/0133824 A1* | 6/2007 | Hibino et al. | 381/104 |
| 2007/0227337 A1 | 10/2007 | Yoshikawa et al. | |
| 2008/0065622 A1* | 3/2008 | Goto et al. | 707/5 |
| 2008/0086687 A1* | 4/2008 | Sakai et al. | 715/716 |
| 2008/0162570 A1* | 7/2008 | Kindig et al. | 707/104.1 |
| 2008/0270532 A1* | 10/2008 | Billmaier et al. | 709/203 |
| 2009/0164429 A1* | 6/2009 | Svendsen et al. | 707/3 |
| 2009/0259621 A1* | 10/2009 | Svendsen et al. | 707/3 |
| 2010/0082135 A1* | 4/2010 | Amidon et al. | 700/94 |
| 2010/0094935 A1* | 4/2010 | Svendsen et al. | 709/204 |

OTHER PUBLICATIONS

BeepScience press release, Beep Science to provide OMA v2 DRM to Sony's mobile music streaming service "StreamMan", Sep. 21, 2004, London.

Jean-Julien Aucouturier et al, Scaling Up Music Playlist Generation, Multimedia and Expo, 2002. ICME '02. Proceedings. 2002 IEEE International Conference on, Aug. 26-29, 2002 vol. 1, pp. 105-108.

MeeMix Internet Radio "Listen to Online Radio for free. MeeMix, Free Internet Radio that gets you." http://www.meemix.com/app/, viewed Nov. 25, 2008, 1 pages.

MeeMix Internet Radio—About MeeMix "Answers to Frequently Asked Questions about music, videos and more at MeeMix." http://www.meemix.com/faq/about_meemix/index.php, viewed Nov. 25, 2008, 1 pages.

Lee Byron "Last.fm Listening History—What have I been listening to?", http://www.leebyron.com/what/lastfm, viewed Nov. 25, 2008, 4 pages.

Musicovery: Interactive WebRadio, http://www.musicovery.com/index3.php?et us, viewed Nov. 25, 2008, 1 pages.

\* cited by examiner

SYSTEMS AND METHODS TO SELECT MEDIA CONTENT

FIELD OF THE DISCLOSURE

The present disclosure is generally related to a systems and methods to select media content.

BACKGROUND

Media distribution and playback systems are becoming increasingly popular. Services and systems that enable access to media content are widely used. Certain systems enable users to store purchased media in a manner that may be more convenient (e.g., ripping media from a CD or DVD). Certain other systems enable users to download media content items (e.g., songs, movies, or other audio or video content) to a media player, such as an "MP3 player". Still other systems allow users to access a predefined playlist or to specify a playlist of media content. Using any of these systems (as well as others), users may tire of the limited media selection, the limitations of static playlists, and/or the annoyance of having to create new playlists to vary the media content.

DETAILED DESCRIPTION

Figure 1:
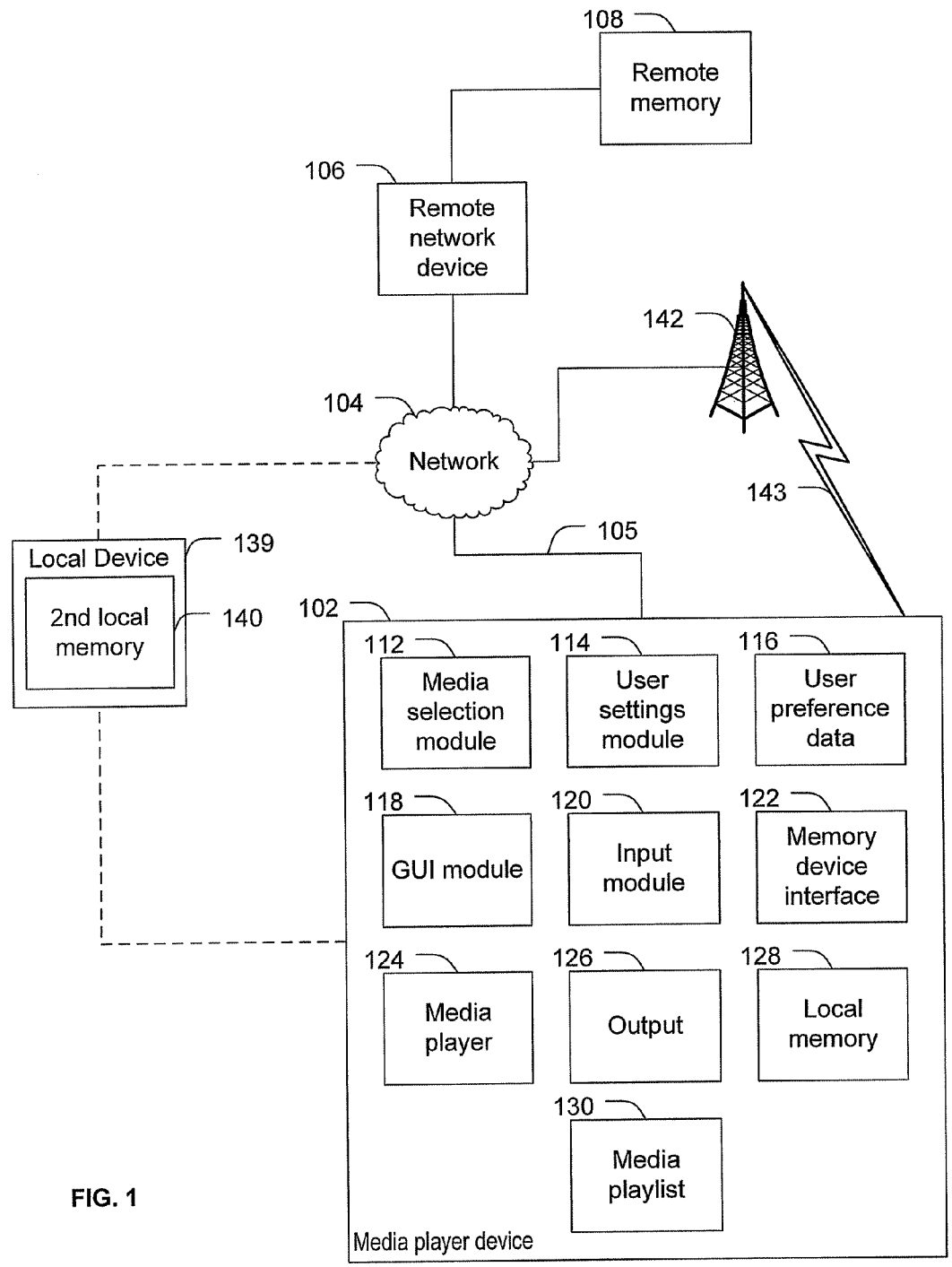
FIG. 1 is a block diagram of a first embodiment of a system to select media content.

In a particular embodiment, a method includes generating a media playlist based on user preference data. The user preference data indicates proportions of each of a plurality of categories of media content to be present in the media playlist. The method also includes generating a user interface display. The user interface display presents the user preference data using a plurality of adjustable bars. Each adjustable bar is associated with one of the categories of media content, and a dimension of each adjustable bar is associated with the proportion of the respective category of media content included in the media playlist. The method further includes receiving user input adjusting the dimension of a first bar. The first bar is associated with a first category of the plurality of categories of media content. The method also includes adjusting the proportion of the first category of media content included in the media playlist based on the user input to generate a modified media playlist.

In another particular embodiment, a system includes a media selection module to generate a media playlist based on user preference data. The user preference data indicates proportions of each of a plurality of categories of media content to be present in the media playlist. The system also includes a graphical user interface (GUI) module to present a user interface display including a representation of the user preference data using a plurality of adjustable bars. Each adjustable bar is associated with one of the categories of media content, and a dimension of each of the adjustable bars is associated with a proportion of the respective category of media content included in the media playlist. The system further includes an input interface to receive an input to adjust the dimension of a first bar. The first bar is associated with a first category of the plurality of categories of media content. The system also includes a user settings module to adjust the user preference data based on the input.

Another particular embodiment includes a computer-readable storage medium. The computer-readable storage medium includes operational instructions that, when executed by a processor, cause the processor to generate a media playlist based on user preference data. The user preference data indicates proportions of each of a plurality of categories of media content to be present in the media playlist. The computer-readable storage medium also includes operational instructions that, when executed by the processor, cause the processor to generate a user interface display. The user interface display presents the user preference data using a plurality of adjustable bars. Each adjustable bar is associated with one of the categories of media content, and a dimension of each of the plurality of adjustable bars is associated with a proportion of the respective category of media content included in the media playlist. The computer-readable storage medium further includes operational instructions that, when executed by the processor, cause the processor to adjust the proportion of a first category of media content included in the media playlist based on received user input to adjust the dimension of a first bar. The first bar is associated with the first category of the plurality of categories of media content.

In yet another embodiment, a method includes dynamically selecting media content items for presentation by a media player based on media selection settings. The method also includes generating an output including a current media content item of the dynamically selected media content items. The method further includes accessing a selected media content item from a memory when the selected media content item becomes the current media content item. When the selected media content item is available at a first local memory, the selected media content item is accessed from the first local memory. When the selected media content item is not available at the local memory, a request is sent to a remote network device to send the selected media content item from a remote memory.

In another particular embodiment, a system includes a media selection module to dynamically select media content items for presentation based on media selection settings. The system also includes a memory device interface to access the media content items selected by the media selection module. When a particular selected media content item is available at a first local memory, the memory device interface accesses the particular selected media content item from the first local memory. When the particular selected media content item is not available at the first local memory, the memory device interface sends a request to a remote network device to send the particular selected media content item from a remote memory. The system also includes a media player coupled to the memory device interface to generate an output stream including the dynamically selected media content items accessed via the memory device interface.

Another particular embodiment includes a computer-readable storage medium. The computer-readable storage medium includes operational instructions that, when executed by a processor, cause the processor to dynamically select media content items for presentation based on media playlist selection settings. The computer-readable storage medium also includes operational instructions that, when executed by the processor, cause the processor to access the selected media content items. When a particular selected media content item is available at a local memory, the particular selected media content item is accessed from the local memory. When the particular selected media content item is not available at the local memory, a request is sent to a remote network device to send the particular selected media content item from a remote memory. The computer-readable storage medium further includes operational instructions that, when executed by the processor, cause the processor to generate an output stream including the dynamically selected media content items.

In a particular embodiment, a method includes dynamically selecting content items for presentation via a media player based on user media selection settings. The user media selection settings specify a proportion of a first category of media content to be presented and a proportion of at least one second category of media content to be presented. The at least one second category includes a user defined category. First media content is associated with the first category based on an intrinsic property of the first media content, and second media content is associated with the user defined category based on a property that is not intrinsic to the second media content. The method also includes generating an output stream presenting the dynamically selected content items.

In another particular embodiment, a system includes a media selection module to dynamically select media content items for presentation based on user media selection settings. The user media selection settings specify a proportion of a first category of media content to be presented and a proportion of at least one second category of media content to be presented. The at least one second category includes a user defined category. First media content is associated with the first category based on an intrinsic property of the first media content, and second media content is associated with the user defined category based on a property that is not intrinsic to the second media content. The system also includes a media player to generate an output stream presenting the dynamically selected media content items.

A particular embodiment includes a computer-readable storage medium. The computer-readable storage medium includes operational instructions that, when executed by a processor, cause the processor to dynamically select media content items for presentation based on user playlist settings. The user playlist settings specify a proportion of a first category of media content to be presented and a proportion of at least one second category of media content to be presented. The at least one second category includes a user defined category. First media content is associated with the first category based on an intrinsic property of the first media content, and second media content is associated with the user defined category based on a property that is not intrinsic to the second media content. The computer-readable storage medium further includes operational instructions that, when executed by the processor, cause the processor to generate an output stream to present the dynamically selected media content items.

FIG. 1 is a block diagram of a first embodiment of a system to select media content. The system includes a media player device 102 adapted to present media content to a user. The media content may include one or more of audio, video, images, speech or any combination thereof. The system may also include a remote network device 106 coupled to the media player device 102 via a network 104. The remote network device 106 may be a server or other computing device used to provide media content to the media player device 102. For example, the remote network device 106 may be coupled to a remote memory 108. A plurality of media content items (e.g., digital files embodying media content) may be stored at the remote memory 108. In a particular embodiment, the media player device 102 is coupled to the network 104 via a landline connection 105. For example, the landline connection 105 may include one or more coaxial cables, one or more optical fibers, one or more wire pairs, other physical connections, or any combination thereof. In another particular embodiment, the media player device 102 is coupled to the network 104 via a wireless connection 143 provided by a wireless service provider 142.

The media player device 102 may include a local memory 128 (e.g., a memory onboard or coupled to the media player device 102) that stores media content for presentation via the media player device 102. Additionally, the media player device 102 may communicate with one or more additional local devices 139 to access media content stored at a second local memory 140 of the one or more local devices 139. The local devices 139 may include desktop computers, notebook computers, media servers, entertainment system devices (e.g., set-top boxes, CD players, DVD players, etc.), other devices that store or access media content stored at a local memory, or any combination thereof. The local devices 139 may communicate with the media player device 102 directly, or via the network 104. The network 104 may include a local area network or a wide area network. For example, the network 104 may include or be a portion of the Internet.

In a particular embodiment, the media player device 102 includes a media selection module 112. The media selection module 112 may generate a media playlist (i.e., a selection of media content items for presentation via the media player device 102). The media selection module 112 may access user preference data 116 and generate the media playlist based on the user preference data 116. The user preference data 116 may indicate proportions of each of a plurality of categories of media content to be present in the media playlist. For example, the user preference data 116 may include information specifying one or more media mixes. Each media mix may identify one or more categories of media content to be present in a media stream and a percentage of the media stream to be selected from each of the one or more categories. The user preference data 116 may be received via a user settings module 114. In a particular embodiment, the media selection module 112 generates the media playlist dynamically by selecting one or more subsequent media content items to be presented based on the user preference data 116 while a current media content item is being presented by the media player device 102. The number of subsequent media content items selected may be determined based on a user specified parameter of the user preference data 116.

The user preference data 116 may include media selection settings. The media selection settings may specify proportions of one or more categories of media content to be presented. For example, the media selection settings may specify a proportion of a first category of media content to be presented and a proportion of at least one second category of media content to be presented. The categories may include user defined categories, predetermined categories, or both. In a particular embodiment, media content is associated with at least one of the categories based on an intrinsic property of the particular media content. For example, the media content may be associated with the category based on a tempo, a beat, a rhythm, a type of instrument used, a duration, an artist, a title, a genre, an album (or other media content compilation), a release date, a type of media (e.g., audio, video, etc.), another property that is intrinsic to the media content, or any combination thereof. In a particular embodiment, media content is associated with at least one of the categories based on a property that is not intrinsic to the media content. For example, the media content may be associated with the category based on a storage location of the media content, a universal resource identifier (URI) or universal resource locator (URL) from which the media content is accessible, another property that is not intrinsic to the media content, or any combination thereof.

In a particular embodiment, the media selection module 112 selects the media content based on a determination of what media content is available for presentation. For example, the media player device 102 may include a memory device interface 122. The memory device interface 122 may determine one or more memory devices that are available to the media player device 102. To illustrate, the memory device interface 122 may determine whether the second local memory 140, the remote memory 108, or both, are accessible by the media player device 102. The media selection module 112 may select media content to generate a media playlist 130 based on the memory devices that are accessible.

The memory device interface 122 may also be operable to access media content items selected for presentation by the media selection module 112. For example, the memory device interface 122 may access the media content items of the media playlist 130 to generate an output based on the media playlist 130. The memory device interface 122 may access the media content items that are available at the local memory 128 of the media player device 102 from the local memory 128. Additionally, when a particular media content item is not available at the local memory 128, the memory device interface 122 may access the particular media content item at the remote memory 108 via the remote network device 106. In a particular embodiment, when the particular media content item is not available at the local memory 128, the memory device interface 122 accesses the particular media content item at the second local memory 140 via the local device 139. For example, after determining that the particular media content item is stored at the second local memory 140, the memory device interface 122 may send a request via the network 104 to the remote network device 106. The request may identify the particular media content item and the storage location of the particular media content item. The remote network device 106 may send a request for the particular media content item to the local device 139. The local device 139 may respond to the request from the remote network device 106 by sending the particular media content item to the remote network deice 106. The remote network device 106 may send the particular content item to the media player device 102. In an illustrative embodiment, the media player device 102 includes a mobile communications device and the local device 139 includes a computing device that is not in direct communication with the mobile communications device (such as a desktop computer). Thus, media content stored at the second local memory 140 of the local device 139 can be accessed by the media player device 102 even when the media player device 102 and the local device 139 are not in direct communication.

The media player device 102 may also include a graphical user interface (GUI) module 118. The GUI module 118 may present a user interface display at an output 126 of the media player device 102. In a particular embodiment, the user interface display includes a representation of the user preference data 116 using a plurality of adjustable display objects. For example, the adjustable display objects may include adjustable bars in a bar graph. Each of the adjustable display objects may be associated with one of the categories of media content. A dimension (e.g., length, width, area, etc.) of each of the adjustable display objects is associated with a proportion of the respective category of media content included in the media playlist.

The user interface display may also include a list identifying previously presented media content items (also called a stream list). The stream list may include the previously presented media content items, a current media content item (i.e., a media content item being presented) and one or more pending content items (e.g., media content items that have been selected by the media selection module 112 for presentation but have not yet been presented). In a particular embodiment, each of the identified previously presented media content items is presented via the user interface display in a color that identifies a category from which the media content item was selected. For example, the media content item may be presented in a color corresponding to a color of a particular one of the plurality of adjustable display objects. The particular adjustable display object may be associated with the category of media content from which the media content item was selected.

The media player device 102 may also include an input module 120 (also called an input interface). The input module 120 may receive input from a user to modify the user preference data 116. For example, the user may interact with the user interface display via the input module 120 to adjust a dimension of a first bar in the user interface display. The first bar may be associated with a first category media content. In response to the user adjusting the first bar, the user settings module 114 may determine new user preference data 116. The proportion of the first category in the media playlist 130 may be modified based on the adjustment to the first bar. For example, when the first bar is lengthened, the proportion of the first category of media content in the media playlist 130 may be increased. Conversely, when the first bar is shortened, the proportion of the first category in the media playlist 130 may be decreased. Additionally, proportions of one or more other categories of media content may also be modified to accommodate the changes to the proportion of the first category. The new user preference data 116 generated by the user settings module 114 in response to the user input may include the modified proportions.

The media player device 102 may also include a media player 124. The media player 124 may be operable to generate an output (e.g., at the output 126 of the media player device 102) including a current media content item. The media player 124 may receive media content items from the memory device interface 122. In a particular embodiment, the media player 124 may decode, buffer, or otherwise process the received media content items to generate the output 126.

In a particular embodiment, systems and methods for selecting media content may be used to provide a streaming media service. A streaming media server may enable users to personalize a dynamically variable stream of media on the basis of user defined category based percentages. The streaming media service may provide a broad range of network based content and may also mix locally available content into the stream. Additionally, the streaming media service may enable a media player (e.g., the media player 124 or the media player device 102) to include content that is stored locally, but not on the media player (e.g., media stored on a desktop computer) in the media stream. The stream of media content may be generated dynamically based on specified categories. The categories may be pre-determined, user defined, or both. Additionally, the user may specify percentages (or other proportions) of each category to be in the media stream. The media stream may be provided across a variety of user devices, including, mobile communication devices, dedicated media devices (e.g., MP3 players, portable digital video disk players, digital video recorders, etc.), portable computing devices, desktop computing devices, entertainment system devices (e.g., set-top box devices, compact disk players, digital video disk players, televisions, high-definition televisions etc.), other computing devices, or any combination thereof. Additionally, different mixes of media may be scheduled to be presented automatically based on time, day, date, location or other factors.

At start up, a default media stream may be automatically provided. In a particular embodiment, the default media stream is at least partially personalized based on the user's demographic information. The user may subsequently define personalized media mixes. A particular user may specify multiple different media mixes. The media mixes may be scheduled to automatically be applied at different times. For example, a calendar-like interface may be used to display when the user's various media mixes are to be used, to change their duration, sequencing, repetition, other scheduling-based changes to the media mix or selection of the media mix to use, or any combination thereof.

In a particular embodiment, the streaming media service may be accessed using a media player (e.g., the media player 124). The media player 124 may include controls to control the media stream, e.g., to stop, pause, rewind, fast forward, skip particular media content, replay particular media content, and so forth. The media player 124 may generate a user interface display that provides the controls as user selectable display objects. Additionally, the user interface display may include information about media selection settings used to select the media stream. For example, the user interface display may represent a media mix as a bar graph with the categories displayed on the X-axis and percentage values displayed on the Y-axis. When the representation of the media mix is displayed while the media player 124 is presenting media content, a display object (e.g., a bar) associated with the category corresponding to the media content currently playing may be highlighted and/or animated in the user interface display. For example, the display object may move to the beat of music being played by the media player 124. Categories in the user interface display may be depicted in different colors to enable a user to differentiate the categories. This may also provide the basis for associating selected songs with their corresponding categories by displaying the names of the selected songs in the same color as the associated category. In a particular embodiment, the user interface for the streaming media service may be implemented using one or more applets that may be individually opened, closed, or linked together.

The user interface display may also include display objects associated with categories of media content that are not in the media mix being presented by the media player 124. The display objects may be graphically displayed as "pseudo-albums". For example, one or more of the display objects may look like an album cover displaying a name of the category along with a graphic image (such as an artist associated with the category, imagery representative of the category, and so forth). The graphic image may be selected by the user, selected at the streaming media service, or selected automatically based on an analysis of the category.

The user interface display may enable the user to drag and drop a category from the set of categories that are not in the current media mix to the media mix display to add the category to the media mix. A category may also be added to the media mix by selecting an 'Add To Mix' user selectable display option, or through usage of menus associated with the user interface display.

The user interface display may also include a stream list that provides chronological information regarding media content that has been presented. For example, where the media content includes music, the stream list may provide an artist name or other artist information and a song title. The stream list may also provide other information, such as an album, a genre, a date, a category, or any combination thereof. The stream list may color code the information according to the category from which the media content was chosen. The color coding may provide a visual indication that associates the media content being presented and the associated category.

A user may add a media content item (e.g., a song, a video clip, or another media file) to a category from the stream list. For example, the user interface display may include a user selectable display object to add a selected media content item from the stream list to a category, such as a favorites category. The user may establish more than one favorites category. For example, the user may specify different favorites categories for different types of media, for different genres of media, or based on other factors intrinsic to or not intrinsic to the media content. To illustrate, the user may specify a favorite blues category, a favorite female vocals category, and so forth. In a particular embodiment, a user may specify media content to add to a favorites category via the user interface display. For example, when a particular media content item is being presented, the user may select a user selectable display option or perform a specific key sequence to add the media content item to the favorites category. In a particular embodiment, a storage location of a media content item is not changed based on the media content item being placed in the favorites category; rather, a list is generated that includes pointers to storage locations associated with media content items in the favorites category. In another particular embodiment, the storage location of the media content item is modified, or an additional copy of the media content item is stored when the media content item is added to the favorites category.

In a particular embodiment, a user of the streaming media service may be provided with a personalized, dynamically variable stream of media content on the basis of user defined categories and user specified percentages. The media content that makes up the stream of media content may be determined based on the user's media profile, which the user may define according to his or her preferences. The media profile may include one or more user defined media mixes that specify the composition of the stream of media content. Different media mixes may specify different streams of media content. The media profile may also include a play schedule. The play schedule may determine the conditions under which different media mixes are applied to determine the stream of media content. Thus, the play schedule enables the stream of media content to automatically vary based on the conditions, such as time of day, day of week, location, date, other user specified conditions, or any combination thereof.

In a particular embodiment, a media mix includes header information describing the mix, the categories of media associated with the media mix, and proportions of each category used to generate the stream of media content. The media mix may be used to dynamically vary the media content that is presented. The media mix may also identify one or more specific media content items to be presented. For example, a user defined category may include only a single media content item.

In a particular embodiment, a media profile includes user identification information, one or more media mixes, a play schedule, and a stream list (e.g., the media playlist 130). The user identification information may include a user identifier associated with a user that is unique with respect to the streaming media service. Alternatively, a Public User Identity (PUID), as defined in the Third Generation Partnership Project (3GPP) Internet Protocol (IP) Multimedia System (IMS) could be used for this purpose. A billing number associated with a user account may be used as the user identifier. Alternatively, a billing number associated with a user account of a related service may be used. For example, a billing number of an account with an internet service provider (ISP), a mobile communication service provider, a telephone service provider, a media service provider (e.g., a radio or television provider), or another communication service provider may be used.

Media content items presented via the streaming media service are each associated with a category. During run time (i.e., as the streaming media service is operating), media content items are dynamically selected on the basis of criteria specified by the categories and the proportions of the categories specified to be present. Categories may include various mechanisms for selecting media content items. For example, a category may select media content items based on a search result. That is, the category may specify search criteria. The search criteria may specify search terms, such as an artist, a title, an album, a genre, a year, a time period (e.g., a decade), a type of media (e.g., audio, video, both), a tempo, a duration, other information associated with particular media content items, or any combination thereof. The search criteria may also specify a search location, such as a particular list to search (e.g., a Top 100 list) or a particular location to search (e.g., a network address, a memory device, a folder, etc.).

In another example, a category may specify that media content items are to be selected based on a static or dynamic list. To illustrate, the media content item may point to a web-based list, such as a "Top Hits" list, a "Best of" list, a regional list (e.g., associated with a specific geographic region), a time-based list (e.g., "Hits of the 60's", etc.), a genre-based list (e.g., Blues, Jazz, Heavy Metal, etc.). In another illustrative example, the category may search a list associated with another user, such as a friend's playlist or favorites list.

In another example, a category may specify that media content items are to be selected based on a recommendation mechanism. To illustrate, media content items may be selected that are determined to be similar to media in the user's favorites folder. For example, songs that are determined to be similar to songs in the user's favorites folder may be selected by a particular category of media content. In another illustrative example, media content items may be selected by the category based on the media content items being popular among a particular group of users (e.g., users that have similar tastes, or similar demographics to the user). In another example, a category may specify that media content items may be selected based on a user specified criteria, such as a storage location of the media content.

In a particular embodiment, a user can manually select a media mix to apply. By default, the last used media mix may be applied when the media player is launched or started. Additionally, the media mix may be selected automatically based on specified user preferences (e.g., based on time, day, date, location, etc.). A manually invoked media mix may pre-empt a scheduled media mix. Additionally, a manually invoked media mix may continue until terminated by the user or until the media player is closed. A calendar-like user interface may be provided for visually scheduling different music mixes, and showing the relationships between the scheduled playing times.

A media mix may include header information such as a name of the media mix to provide for user identification of the media mix, a name of the creator of the media mix, a date created, a last date or time the media mix was used, a description of the media mix, other media mix related data, or any combination thereof.

In a particular embodiment, a media mix may be maintained (e.g., stored) at a network element associated with the streaming media service. The media mix may also be stored at a local user device (e.g., the local device 139), such as a desktop computer, a notebook computer, a portable media player, or another computing device. When a local copy of the media mix is stored at the local user computing device, the user may update the local copy of the media mix at the local user device and synchronize the local copy of the media mix with the copy of the media mix at the remote network element.

In a particular embodiment, the media mix may be configured based on user preference information. For example, a user may be provided with samples of music and prompted to rate the samples. The samples could be representative music samples from various categories of music. For example, the songs could be rated based on a scale of 1 to 3, 1 to 5, 1 to 10, or based on some other scale. A category score may be determined based on the user preference information. The category score may be used to determine a percentage of each of a plurality of categories of media content to be included in the media mix. For example, when a scale of 1 to 5 is used, the top rated categories (e.g., those with an average rating of higher than 3) may be selected to be included in the media mix. Additionally, the percentage of each of the categories of media content in the media mix may be proportionally assigned based on the average rating of each of the categories. If none of the categories receive a rating higher than 3, another technique may be used to automatically generate the media mix (such as, generating a mix of all categories of media content available to the media player). A hierarchy of media content may be used to narrow down the user preference information. For example, when the user likes (e.g., rates highly) a sample from the song "Jumping Jack Flash" by the Rolling Stones, other similar media content, such as other 60's rock and roll, may be presented to determine whether the user likes the entire category of media content.

The user may choose to repeat the user preferences gathering process to develop different media mixes for different types of media. For example, the user may use the process to generate user preferences information for different types of music, such as meditation, high energy, and FemRock.

The user preference information may be stored at a network element associated with the media streaming service. Additionally, a copy of the user preferences information may be stored at a user device (e.g., the user preference data 116 of the media player device 102). An advantage of gathering user preference information as compared to the user identifying known categories, artists, or media content items, is that the user may not know how to accurately describe the category or categories of media content that the user prefers. Thus, gathering user preference information may enable more accurate selection of categories and may allow the user to expand his or her media horizons to encompass media content to which the user has not previously been exposed.

In a particular embodiment, an initial media mix is defined based on a variety of user information that is available to a provider of the streaming media service. For example, the user information may include demographic information provided by the user when the service is initiated. Alternatively, the user information may be based on a location from which the user accesses the streaming media service. For example, a user in a particular geographic area may receive a default media mix based on an average or other statistical evaluation of media preferences of other users in that geographic area. In another particular embodiment, the user uploads or points to a list of favorites. The user preference information is determined by analyzing the list of favorites. For example, a distribution curve may be determined based on the content specified in the list of favorites. To illustrate, the user preferences may be identified by determining a genre or other category of each media content item specified in the list of favorites. Additionally, a percentage of genre or other category may be determined.

After the initial media mix is determined, the media mix may be refined automatically based on user feedback. For example, the streaming media service may identify media content that is similar to content that the user has indicated a preference for. To illustrate, where the media content is music, the streaming media service may determine other music that sounds similar to music that the user enjoys. The similar music may be selected based on an analysis of various characteristics of the user's favorite music. For example, the analysis may include beat, harmony, rhythm, tempo, vocals, genre, instruments used, a time period associated with the content, artists, other information about the media content, or any combination thereof. Based on the analysis, a media signature may be developed. The media signature may be used to search for other media content that the user may enjoy.

When a category is added to a media mix, it may initially be assigned a default proportion value, or a user provided proportion value. The proportion value may indicate a proportion of the media stream that should come from the category. To illustrate, a first category added to a new media mix may contribute 100% to the mix since it is the only category in the media mix. When a second category is added to the media mix, a proportion value of the second category may be assigned a default value of 50%, and the proportion value of the first category may be changed to 50%. Alternately, the user may specify the proportion value to be assigned to the second category. For example, the user may specify that the second category should contribute 25% to the media mix, in which case the first category's proportion value will be changed from 100% to 75%. When each additional category is added, the user may be prompted for the desired proportion value that the added category should contribute to the media mix. The proportion values of one or more of the categories already in the media mix may be automatically adjusted accordingly.

The user may subsequently change the proportion of any of the categories in a media mix. For example, the percentages of each category in the media mix can be displayed, and the user can manually adjust each value. In another example, a graphical representation of the media mix may be presented to the user. The graphical representation may represent each category in the media mix in a manner that illustrates the proportion that each category contributes to the media mix. When the user changes the proportion that a category contributes to the media mix, the graphical representation may be adjusted to illustrate the change. Additionally, the user may adjust the proportion of each category in the media mix by interacting with the graphical representation. To illustrate, a size of a display object representing a first category may be adjusted by selecting and modifying the display object. The proportion of the first category in the media mix may be adjusted in response to the user interaction. Additionally, proportions of one or more other categories may be adjusted to ensure that 100% of the media mix is accounted for.

In a particular embodiment, a proportionate percentage category adjustment technique may be used. For example, an algorithm may be used to determine a percentage of each category in the media mix after an adjustment is made to one of the categories. In a particular embodiment, the algorithm may be applied in order from the category that makes up the largest proportion of the media mix to a category that makes up the smallest proportion of the media mix. The proportion determined may be rounded up. Using this process, categories that make up larger proportions of the media mix may receive larger adjustments than categories that make up a smaller proportion of the media mix. If the algorithm does not provide sufficient adjustment due to rounding errors, then any remaining adjustments needed (e.g., to make the total equal 100%) may be added to the category that makes up the largest proportion of the media mix. Additionally, a minimum proportion may be specified. Categories of media content that do not contribute at least the minimum proportion to the media mix may be removed from the media mix. Further, a maximum number of categories that may be used to determine the media mix may be specified. When a new category is added to the media mix, one or more categories that form a smaller proportion of the media mix may be removed from the media mix when the maximum number of categories is exceeded.

In a particular embodiment, a length of the stream list (e.g., a number of previously presented media content items and a number of content items yet to be presented) may be adjusted based on user configurable settings. The stream list may include a pointer or other indicator designating the media item currently being presented. The user may move the pointer or other indicator to advance to the next media content item or to replay a media content item previously presented.

The stream list may provide a history of media content items presented. For example, when the media content includes music, the stream list may identify an artist and song title of a currently playing song, and a number of previously played songs. Additionally, at least one song that has been selected for presentation but that has yet to be played may be displayed. For example, a next song to be played may be displayed. The user interface may provide additional information related to the media content items in the stream list when a media content item is selected in the stream list. In addition to providing a list of media content items played, the stream list may also enable the user to skip ahead, or return to a previously presented media content item. Note that the stream list is not merely a static playlist. Rather, the stream list is a dynamically generated list of media content items. For example, the stream list may change in real time as new media content items are selected to be presented.

In a particular embodiment, the stream list may be stored in a manner that is persistent. That is, when the media player (e.g., the media player 124) is closed or not in use, the stream list may be maintained so that when the user restarts the media player, the stream list starts where the user last left it. The stream list persistence may be provided even if the user uses the streaming media service at more that one user device. For example, the stream list may be stored at a remote network element (e.g., the remote network device 106) that is accessible by devices that the user uses to access the stream list. When a user starts the media player, the most recent stream list may be downloaded from the remote network element to the client (e.g., the user's media player device).

When a user starts the streaming media service for the first time, the stream list may be empty. A first media content item is selected as the current media content item and played. Additionally, one or more second media content items may be selected and shown in the stream list as pending items (i.e., media content items yet to be presented). When the first media content item is over, the first media content item may be pushed down the stream list to become a historical item, and the second media content item may be advanced to become the current media content item.

The user may replay previously presented songs in the stream list by selecting them for play. This may be accomplished by scrolling a current item pointer through the stream list, and selecting a previously presented content item for presentation. In a particular embodiment, an index value of the current item pointer is changed to an index value of the selected media content item, and the selected media content item is presented via the media player as the current media content item. In a particular embodiment, when the selected media content item ends, the current item pointer advances up the stream list, replaying the previously presented songs in the same sequence as before. In another particular embodiment, a subsequent pending item (e.g., the first pending item) is presented after the selected content items ends.

In a particular embodiment, the streaming media service is operable even when the remote network element is not accessible (e.g., when the user's media player device is off-line). During operation, the media player may access and present media content that is available locally to the media player (e.g., stored at a device executing the media player), media content that is stored at a remote memory, or any combination thereof based on user preference settings or which content is accessible by the media player device. In a particular embodiment, location or presence information may be determined to select a media mix for presentation. For example, a particular music mix may be automatically selected and presented when the user arrives at home on Friday night, and a different music mix may be automatically selected when the user is at work.

In a particular embodiment, the media player may store media content items from the stream list at a buffer. The buffer may enable quick replay of media content items on the stream list, mixing of local content and remote content, and persistence of media content between sessions when the media player is off-line (e.g., does not have access to a remote network element associated with the streaming media service). In another particular embodiment, media content items may be replayed by accessing the media content items from a memory. For example, media content items may be replayed by requesting the media content items from the remote network element or from the local memory at which the media content items are stored.

The media player may also accommodate digital rights management. For example, media content may be stored at the media player device in a manner that impedes or prohibits copying the media content to another storage location. In another example, the media content items may be encrypted and a decryption key may be stored at the media player device.

In a particular embodiment, a user may access the streaming media service using a portable device, such as a mobile telephone. A media player application at the mobile device may access the streaming media service via a network, such as a wireless network. In a particular embodiment, a media player application at another user device, such as a desktop computer, may send media content to the portable device via the network. Further, a multicast capability may be used to send media content from the streaming media service to one or more user devices. Further, rather than streaming the media content in real time, the media content may be downloaded to the media player device (e.g., in bursts). A buffer at the user's media player device may store the media content, which may be accessed from the buffer during presentation.

The streaming media service may generate revenue through advertising (e.g., receiving payment from advertisers for presenting advertising content with the media content); through subscription fees (e.g., monthly fees for access to the streaming media service or particular aspects of the streaming media service); through sales of media content or related items (e.g., sales of media content items or related items provided to users); through subscriber up-sales or retention (e.g., costs of the streaming media service may be offset in whole or in part through revenue received for other services bundled with or offered in addition to the streaming media service). In a particular embodiment, the streaming media service may be network-based and provide a limited number (e.g., one, two, five, or more) user editable media mixes per user. Additional media mixes or functionality may be provided on a subscription basis.

In a particular embodiment, the streaming media service may be used by a business entity to customize media presented at various times, or on various days or dates. For example, a bar, a restaurant, or another establishment may use input from customers to determine a music profile (or other media mix). Customers of the business entity may vote for media content that they like or rate media content that is presented (e.g., via one or more kiosks). The music profile or media mix may be determined from the votes. For example, the votes or ratings may be analyzed to determine categories that should be in the music profile or media mix by the selecting categories associated with media content items (e.g., songs) that receive the most votes or the highest ratings.

Media presented at an establishment may be determined based on the music profile or media mix. Since different customers may frequent the establishment at different times, or on different days, the music profile or media mix used at a particular time or on a particular day may be based on votes or ratings received during the particular time or on the particular day. Thus, the establishment may present media that appeals to its customers at minimal cost.

Figure 2:
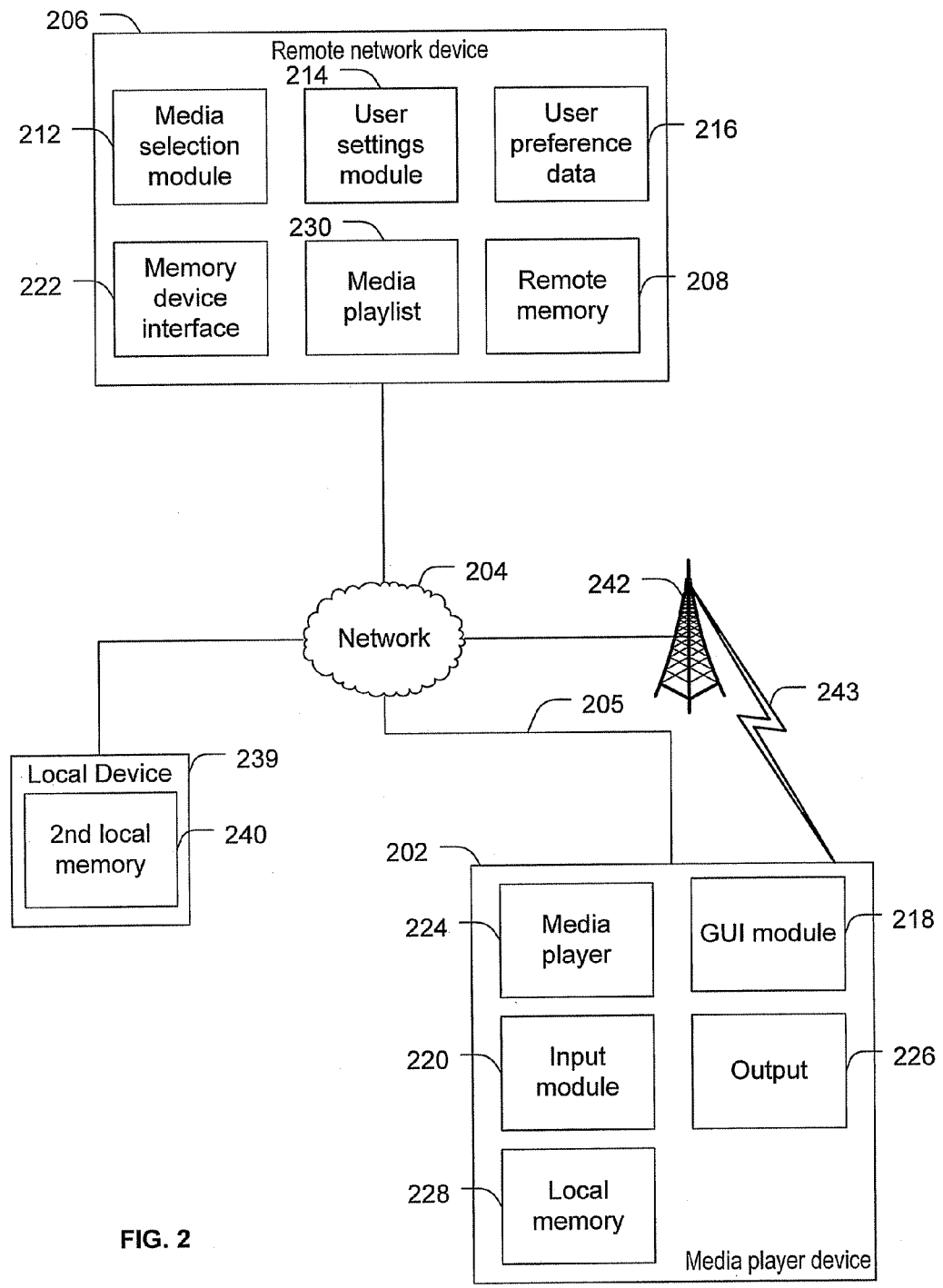
FIG. 2 is a block diagram of a second embodiment of a system to select media content.

FIG. 2 is a block diagram of a second embodiment of a system to select media content. The system includes a media player device 202 adapted to present media content to a user. The system may also include a remote network device 206 coupled to the media player device 202 via a network 204. The remote network device 206 may be a server or other computing device used to provide media content to the media player device 202. For example, the remote network device 206 may be a server associated with a streaming media service. The remote network device 206 includes a remote memory 208. A plurality of media content items (e.g., digital files embodying media content) may be stored at the remote memory 208.

In a particular embodiment, the media player device 202 is coupled to the network 204 via a landline connection 205. For example, the landline connection 205 may include one or more coaxial cables, one or more optical fibers, one or more wire pairs, other physical connections, or any combination thereof. In another particular embodiment, the media player device 202 is coupled to the network 204 via a wireless connection 243 provided by a wireless service provider 242. Additionally, one or more additional local devices 239 may be coupled to the network 204 via landline connections or wireless connections.

The media player device 202 may include a media player 224. The media player 224 may be operable to generate an output (e.g., at an output 226 of the media player device 202) including media content. The media player 224 may receive media content items from a local memory 228 or from the remote network device 206. In a particular embodiment, the media player 224 may decode, buffer, or otherwise process the received media content items to generate the output 226.

In a particular embodiment, the remote network device 206 includes a media selection module 212. The media selection module 212 may dynamically select media content items for presentation at the media player device 202. The media selection module 212 may access user preference data 216 and select the media content items based on the user preference data 216. The user preference data 216 may indicate proportions of each of a plurality of categories of media content to be present in a media playlist 230. For example, the user preference data 216 may include information specifying one or more media mixes. Each media mix may identify one or more categories of media content to be present in a media stream and a percentage of the media stream to be selected from each of the one or more categories. In a particular embodiment, the media selection module 212 generates the media playlist 230 dynamically by selecting a next media content item to be presented based on the user preference data 216 while a current media content item is being presented at or sent to the media player device 202.

The media player device 202 may include a local memory 228 (e.g., a memory onboard or coupled to the media player device 202) that stores media content for presentation at the media player device 202. Additionally, the remote network device 206 may communicate with the one or more additional local devices 239 to access media content stored at a second local memory 240 of the one or more additional local devices 239 and to provide the media content to the media player device 202. The additional local devices 239 may include media servers, mobile communication devices, dedicated media devices (e.g., MP3 players, portable digital video disk players, digital video recorders, etc.), portable computing devices, desktop computing devices, entertainment system devices (e.g., set-top box devices, compact disk players, digital video disk players, televisions, high-definition televisions etc.), other devices that store or access media content stored at a local memory, or any combination thereof. In a particular embodiment, the remote network device 206 sends a stream of data including media content items and instructions. The instructions may direct the media player device to generate output that includes the media content items received via the stream of data, and other media content items that are stored at the local memory 228.

The media selection module 212 may select media content for presentation based on user preference data 216. The user preference data 216 may include media selection settings. The media selection settings may specify proportions of one or more categories of media content to be presented. For example, the media selection settings may specify a proportion of a first category of media content to be presented and a proportion of at least one other category of media content to be presented. The categories may include user defined categories, predetermined categories, or both. In a particular embodiment, media content is associated with at least one of the categories based on an intrinsic property of the particular media content. For example, the media content may be associated with the category based on a tempo, a beat, a rhythm, a type of instrument used, a duration, an artist, a title, a genre, an album (or other media content compilation), a release date, a type of media (e.g., audio, video, etc.), another property that is intrinsic to the media content, or any combination thereof. In a particular embodiment, media content is associated with at least one of the categories based on a property that is not intrinsic to the media content. For example, the media content may be associated with the category based on a storage location of the media content, a universal resource identifier (URI) or a universal resource locator (URL) from which the media content is accessible, another property that is not intrinsic to the media content, or any combination thereof.

In a particular embodiment, the media selection module 212 selects the media content for presentation at the media player device 202 based on a determination of what media content is available for presentation. For example, the remote network device 206 may include a memory device interface 222. The memory device interface 222 may determine memory devices that are accessible to the remote network device 206. To illustrate, the memory device interface 222 may determine whether the additional local device 239 is online and the second local memory 240 is accessible to the remote network device 206. The media selection module 212 may select media content to generate the media playlist 230 based on the memory devices that are accessible.

The memory device interface 222 may also be operable to access media content items selected for presentation by the media selection module 212. For example, the memory device interface 222 may access the media content items of the media playlist 230 to generate an output based on the media playlist 230. The memory device interface 222 may access the media content items that are available at the remote memory 208 from the remote memory 208. Additionally, when a particular media content item is available at the local memory 228, the memory device interface 222 may send instructions to the media player device 202 to access the particular media content item from the local memory 228. In a particular embodiment, when the particular media content item is available at the second local memory 240, the memory device interface 222 accesses the particular media content item at the second local memory 240 via the local device 239. For example, after determining that the particular media content item is stored at the second local memory 240, the memory device interface 222 may send a request for the particular media content item to the local device 239. The local device 239 may respond to the request from the remote network device 206 by sending the particular media content item to the remote network device 206. The remote network device 206 may send the particular content item to the media player device 202. In an illustrative embodiment, the media player device 202 includes a mobile communications device and the local device 239 includes a computing device that is not in direct communication with the mobile communications device (such as a desktop computer). Thus, media content stored at the second local memory 240 of the local device 239 can be accessed by the media player device 202 even when the media player device 202 and the local device 239 are not in direct communication.

In a particular embodiment, the media player device 202 includes a graphical user interface (GUI) module 218. The GUI module 218 presents a user interface display at an output 226 of the media player device 202. In a particular embodiment, the user interface display includes a representation of the user preference data 216 using a plurality of adjustable display objects. For example, the adjustable display objects may include adjustable bars in a bar graph. Each of the adjustable display objects may be associated with one of the categories of media content. A dimension (e.g., a length, a width, an area, etc.) of each of the adjustable display objects is associated with a proportion of the respective category of media content included in the media playlist 230.

The user interface display may also include a list identifying previously presented media content items. The list of previously presented media content items as well as a current content item may also be referred to as a stream list (or media playlist). The stream list may include the previously presented media content items, a current media content item (i.e., a media content item being presented) and one or more pending content items (e.g., media content items that have been selected by the media selection module 212 for presentation but have not yet been presented). In a particular embodiment, each of the identified previously presented media content items is presented via the user interface display in a color that identifies a category from which the media content item was selected. For example, the media content item may be presented in a color corresponding to a color of a particular one of the plurality of adjustable display objects. The particular adjustable display object may be associated with the category of media content from which the media content item was selected.

The media player device 202 may also include an input module 220 (also called an input interface). The input module 220 may receive input from a user to modify the user preference data 216. For example, the user may interact with the user interface display via the input module 220 to adjust a dimension of a first bar in the user interface display. The first bar may be associated with a first category media content. In response to the user adjusting the first bar, the user settings module 214 may determine new user preference data 216. The proportion of the first category in the media playlist may be modified based on the adjustment to the first bar. For example, when the first bar is lengthened, the proportion of the first category of media content in the media playlist 230 may be increased. Conversely, when the first bar is shortened, the proportion of the first category in the media playlist 230 may be decreased. Additionally, proportions of one or more other categories of media content may be modified also to accommodate the changes to the proportion of the first category. The new user preference data 216 generated by the user settings module 214 in response to the user input may include the modified proportions.

Figure 3:
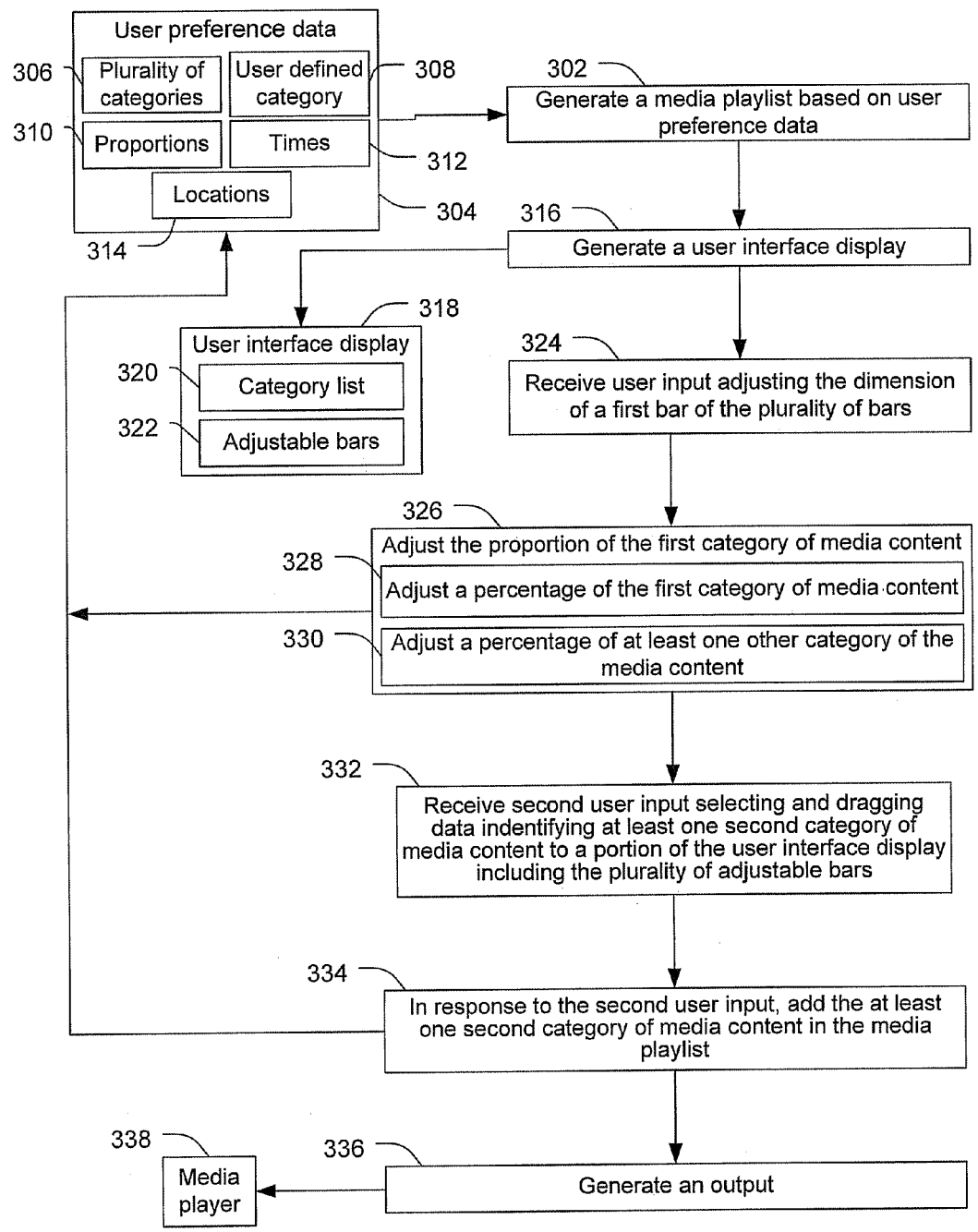
FIG. 3 is a flow chart of a first embodiment of a method of selecting media content.

FIG. 3 is a flow chart of a first embodiment of a method of selecting media content. The method includes, at 302, generating a media playlist based on user preference data 304. The user preference data 304 may indicate proportions 310 of each of a plurality of categories 306 of media content to be present in the media playlist. The user preference data 304 may include at least one user defined category 308 as well as settings related to particular times 312, locations 314, or both. In a particular embodiment, the user defined category 308 categorizes media content based on a property that is not intrinsic to the particular media content. For example, the user defined category 308 may categorize particular media content based on a storage location of the particular media content. In another example, the user defined category 308 may categorize particular media content based on the particular media content being associated with a particular universal resource identifier (URI) or universal resource locator (URL). In a particular embodiment, the user defined category 308 categorize a plurality of otherwise unrelated selected content items. That is, a particular user defined category 308 may include a plurality of media content items that are only related because each media content item is associated with the particular user defined category 308.

The method also includes, at 316, generating a user interface display 318. The user interface display 318 presents at least a portion of the user preference data 304 using a plurality of adjustable bars 322. For example, each of the adjustable bars 322 may be associated with one of the plurality of categories 306 of media content. A dimension of each of the adjustable bars 322 is associated with a proportion 310 of one of the respective categories 306 of media content. For example, as discussed further with reference to FIG. 8, a length of an adjustable bar in the user interface display 318 may indicate a percentage of a media category in the media playlist. In other embodiments, other display objects may be used to represent the proportion of the categories of media content in the media playlist.

The method may also include, at 324, receiving user input adjusting the dimension of a first bar of the plurality of adjustable bars 322. For example, the first bar may be associated with a first category of the plurality of categories 306 of media content. The method also includes, at 326, adjusting the proportion of the first category of media content included in the media playlist based on the user input to generate a modified playlist. In a particular embodiment, adjusting the proportion of the first category of media content may include, at 328, adjusting a percentage of the first category of media content. Additionally, a percentage of at least one other category (e.g., a second category) of media content may be adjusted, at 330. The proportion of the first category of media content may be adjusted by modifying the user preference data 304. For example, when the percentage of the first category of media content is adjusted, at 328, the proportion 310 indicated in the user preference data 304 may be modified. Additionally, one or more other proportions 310 may be modified to adjust the percentage of the at least one other category of media content. To illustrate, the user may shorten the first bar. In response to the user shortening the first bar, the percentage of the first category of media content in the media playlist may be reduced. Additionally, the percentage of one or more other categories of media content in the media playlist may be increased such that 100 percent of the media playlist is accounted for.

In a particular embodiment, the user interface display 318 may include a category list 320. The category list 320 may include data identifying at least one other category of media content. The at least one other category of media content is not included in the media playlist. The method may also include receiving input to add a category of media content to the media playlist. For example, the method may include, at 332, receiving second user input selecting and dragging data identifying the at least one other category of media content to a proportion of the user interface display 318 including the plurality of adjustable bars 322. For example, the user interface display 318 may include the category list 320 which identifies one or more first categories of media content that are included in the media playlist as well as one or more second categories that are not included in the media playlist. At 332, the user may select a user interface element (such as an icon or text identifying the category) representative of one of the second categories that are not in the media playlist. The user may drag the user interface element from the category list 320 to the adjustable bars 322 to indicate that the category should be added to the media playlist. Further discussion and description of this process is described with reference to FIGS. 12 and 13. In response to the second user input, the at least one other category of media content may be added to the media playlist, at 334. For example, the user preference data 304 may be modified to add a proportion of the second category of media content to the media playlist.

The method may also include, at 336, generating an output and presenting the output via a media player 338. In a particular embodiment, the output may include audio output, video output, or both. To illustrate, where the media content includes music, generating the output may include playing selected musical arrangements via the media player 338. The media player 338 may include a consumer electronic device, such as a portable media player including input controls to control presentation of the media playlist (e.g., a keypad, buttons, or a touch screen device), an output to present the media content (e.g., a display screen, a speaker, an output port), and a memory to store at least a portion of the media content (e.g., a solid-state memory device, or a hard disk drive), and a processor to process the media content for display. For example, the media player may include a device such as the local device discussed with reference to FIG. 1 or FIG. 2.

In a particular embodiment, generating the output includes presenting at least one media content item via the media player 338. While a particular media content item is being presented, the user interface display 318 may include information identifying the particular media content item. In an illustrative embodiment, a title or other identifying information associated with the particular media content item being presented may be displayed. Additionally, the particular media content item is associated with one of the plurality of categories 306 of media content and the category of media content is associated with one of the adjustable bars 322. While the particular content item is being presented, the particular adjustable bar associated with the particular content item may be modified. For example, the particular adjustable bar may be animated in the user interface display 318 while the output includes the media content item.

In a particular embodiment, at least one of the plurality of adjustable bars 322 is displayed with a name identifying a representative media content item. The representative media content item is a media content item selected from the category of media content associated with the adjustable bar. The representative media content item may be selected based on an automated process that identifies representative media content items associated with categories, based on the user preference data 304 specifying a representative content item for one or more of the plurality of categories 306, based on a list or metadata identifying representative content items, or any combination thereof.

In a particular embodiment, the adjustable bars 322 are color coded in the user interface display 318. That is, each adjustable bar 322 is associated with a particular color. Additionally, information identifying particular media content items (e.g., titles, artists, etc.) may be presented in a color corresponding to the color of an associated adjustable bar 322. For example, when a media content item is being presented, the title of the media content item may be displayed. The media content item is associated with a particular category of media content, which is associated with a color-coded adjustable bar. To indicate the particular category of media content with which the media content item is associated, the title or other descriptive information may be color-coded in a manner that corresponds to the associated adjustable bar. Similarly, in a particular embodiment, the user interface display 318 includes a list identifying previously presented media content items. Each of the previously presented media content items may be presented in a color corresponding to a color of one of the plurality of adjustable bars 322. The color of the media content item or an indicator associated with media content item may be linked to the category of the media content from which the previously presented media content item was selected.

Figure 4:
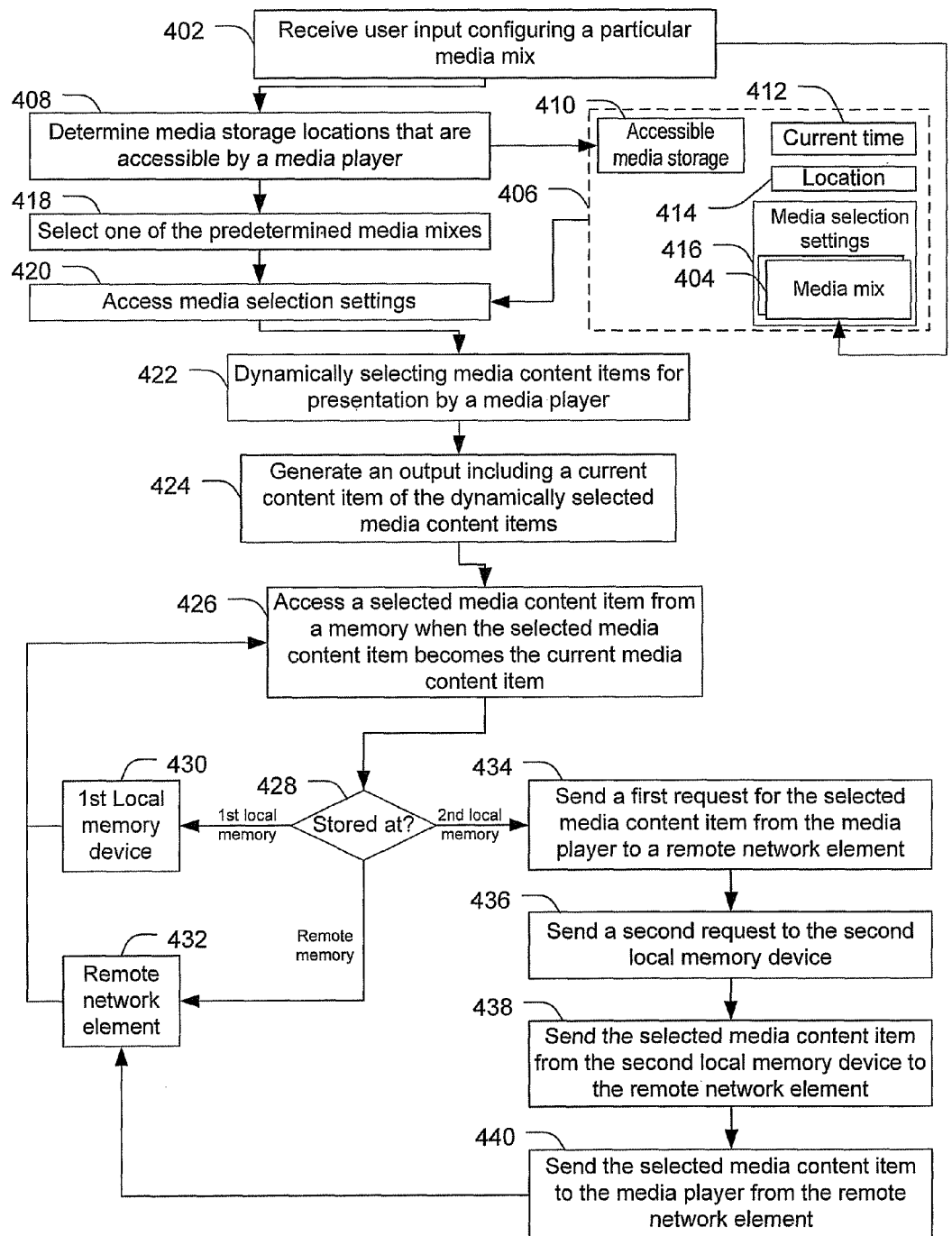
FIG. 4 is a flow chart of a second embodiment of a method of selecting media content.

FIG. 4 is a flow chart of a second embodiment of a method of selecting media content. The method includes, at 402, receiving user input configuring a particular media mix of a plurality of media mixes 404. Each media mix 404 may specify a plurality of categories of media content to be presented and proportions of each category to be presented. The user input may specify proportions of particular categories of media content to be presented. In a particular embodiment, one or more of the media mixes 404 may specify proportions of particular categories of media content to be presented on a particular date, at a particular time, or both. The user input received may specify that a particular media content item (or more than one particular media content item) is to be presented on the particular date, at a particular time, or both. For example, the user input may specify that a particular song is to be played via a media player at a specific date and/or time. To illustrate, a user may specify, via the user input, that a favorite party song is to be played at midnight on New Years Eve. The user input and the media mixes 404 may be stored in media selection settings 416.

The method may also include, at 408, determining media storage locations 410 that are accessible to the media player. For example, the media player may perform a search to determine whether one or more local or remote memory devices can be accessed. In a particular embodiment, the method includes, at 418, selecting one of the predetermined media mixes 404. The selected predetermined media mix 404 specifies proportions of each of a plurality of categories of media content to be presented when the predetermined media mix is used. In a particular embodiment, one of the predetermined media mixes 404 may be selected based on the accessible media storage locations 410, a time (e.g., a current time 412) or on a location 414 (e.g., a current location of the media player). The method also includes, at 430, accessing media selection settings 416. For example, the selected predetermined media mix 404 may be accessed. The method further includes, at 422, dynamically selecting media content items for presentation by the media player based on the media selection settings 416, and, at 424, generating an output including a current content item of the dynamically selected media content items.

In a particular embodiment, the method includes, at 426, accessing a selected media content item from a memory when the selected media content item becomes the current media content item. To illustrate, the media selection settings 416 may be used to select a current media content item and at least one subsequent media content item. When the current media content item ends, the subsequent media content item becomes the new current media content item and is presented by the media player. The media selection settings are then used to select a new subsequent media content item. In this manner, a substantially continuous stream of media content can be generated, with one media content item starting as soon as or shortly after a previous media content item ends. Before or when a media content item becomes the current media content item, the media content item may be accessed from a memory. How and where the selected media content item is accessed from memory may depend on which media storage areas are accessible to the media player (e.g., the accessible media storage 410). For example, at 428, when the selected media content item is stored at a first local memory (e.g., a first local memory device 430), the selected media content item is accessed from the first local memory device 430. When, at 428, the selected media content item is not available from the local memory, a request may be sent to a remote network element 432 to send the selected media content item from a remote memory. In a particular embodiment, when, at 428, the selected media content item is stored at a second local memory, the method may include, at 434, sending a first request for the selected media content item from the media player to the remote network element 432. At 436, the remote network element 432 may send a second request to the second local memory device associated with the second local memory. In response to the second request, at 438, the second local memory device may send the selected media content item from the second local memory device to the remote network element 432. At 440, the selected media content item may be sent to the media player from the remote network element 432. In a particular illustrative embodiment, the media player and the first local memory device 430 are part of a portable media device. For example, the media player and first local memory device may be part of a consumer device (e.g., an "MP3 player") or mobile communication device that includes a media player function. The second local memory device may include a desktop computer device or another network-connected mass memory device that is not presently directly accessible by the media player. When the selected media content item is an item stored at the second local memory device, the media player may send a request to a remote network element via a wide area network accessible by the media player (e.g., a mobile telephony or data network). The request may specify the content item to be accessed and a network address associated with the second local memory (e.g., the desktop computer). The remote network element (e.g., a server associated with a mobile telephony service provider network) may send a request to the second local memory device, and the second local memory device may send the selected media item to the remote network element. The remote network element may send the selected media item to the media player via a network connection to the media player (e.g., the mobile telephony or data network).

In a particular embodiment, the at least one media content item may be selected based on one or more user defined categories in the media selection settings 416. In a particular embodiment, the user defined categories identify media content items based on a storage location of the media content items. For example, the user defined categories may specify that the storage location of the media content items is at the first local memory, at a particular folder of the first local memory, at the remote memory, or at a particular network address, such as a universal resource identifier (URI) or a universal resource locator (URL). In a particular embodiment, the at least one user defined category identifies media content items based on a property that is not intrinsic to the media content items. That is, particular media content associated with a user defined category may include a plurality of otherwise unrelated media content items. The media selection settings 416 may specify proportions of each of the plurality of different categories of media content to be presented.

In a particular embodiment, the method may also include generating a user interface display, as discussed further with reference to FIGS. 7-13. The user interface display may present the media selection settings 416 using a plurality of adjustable display objects. Each adjustable display object may be associated with one category of media content. The user interface display may also include a list identifying previously presented media content items. Each of the previously presented media content items may be presented in a color corresponding to a color of one of the plurality of adjustable display objects associated with the category of media content from which the previously presented media content item was selected.

Figure 5:
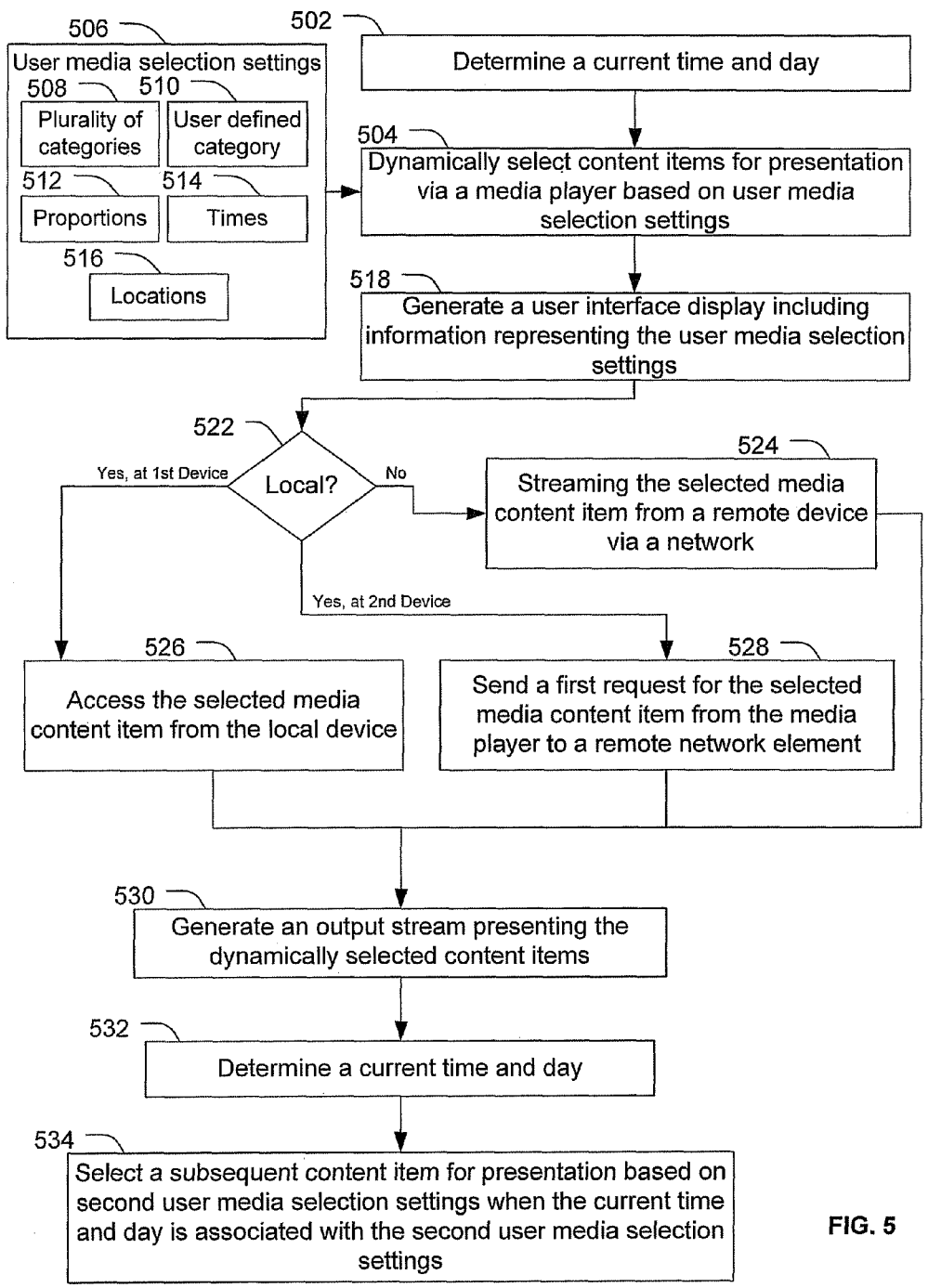
FIG. 5 is a flow chart of a third embodiment of a method of selecting media content.

FIG. 5 is a flow chart of a third embodiment of a method of selecting media content. The method also includes, at 504, dynamically selecting content items for presentation via a media player based on one or more user media selection settings 506. A particular user media selection setting 506 may specify proportions 512 of various categories 508, 510 of media content to be presented. For example, the user media selection settings 506 may specify a proportion of a first category of media content to be presented and a proportion of at least one other category of media content to be presented. The at least one other category of media content may include a user defined category 510. In a particular embodiment, media content is associated with the plurality of media categories 508 based on an intrinsic property of the media content. For example, the media content may be associated with the plurality of media categories 508 based on a genre of the media content, a type of the media content (e.g., audio, video, or both), a file format of the media content, an artist (e.g., a person or group of people) associated with the media content, a time period associated with the media content (e.g., a release date), a tempo of the media content, a length or duration of the media content, another property that is intrinsic to the media content, or any combination thereof. The media content may be associated with the user defined category 510 based on a property that is not intrinsic to the media content. For example, the properties that are not intrinsic to the media content may include a storage location of the media content (e.g., a memory device or folder where the media content is stored), a network address at which the media content may be accessed (e.g., a universal resource identifier (URI) or a universal resource locator (URL)), a time or date that the media content was saved to a particular storage location (e.g., a date a particular song was added to a favorites folder), another property that is not intrinsic to the media content, or any combination thereof.

In a particular embodiment, the proportion 512 of each of the plurality of categories in the user media selection settings 506 is determined based on a time 514, a location 516, or both. For example, the method may include determining a current time and day, at 502. A particular set of the user media selection settings 506 may be used to select media content for display based on the time, the day, or the location of the media player.

The method also includes, at 518, generating a user interface display including information representing the user media selection settings 506. For example, the proportion 512 of a first category of media content and the proportion 512 of a second category of media content to be presented may be displayed using a plurality of adjustable bars. Each of the adjustable bars is associated with a different category of media content and a length of each of the plurality of adjustable bars indicates the proportion (e.g., percentage, or a selection weighting factor) of the respective category of media content to be presented.

In a particular embodiment, the method may also include, at 522, determining a storage location of a particular selected media content item. When, at 522, the particular selected content item is available at a first local device (such as a memory device associated with the media player), the method includes, at 526, accessing the selected media content item from the first local device. When, at 522, the selected media content item is stored at a remote device, the method may include, at 524, streaming the selected media content item from the remote device via a network. In a particular embodiment, when the selected media content item is not stored at the first local device but is stored at a second local device, the method may include, at 528, sending a request to a remote network element. The request may cause the remote network element to send a second request to the second local device associated with the second local memory. The second request causes the second local device to send the selected media content item to the remote network element. The remote network element sends the selected media content item to the media player.

The method also includes, at 530, generating an output stream presenting the dynamically selected media content items. For example, the output stream may include a selection of media content such as music, video or both, presented one content item after another. After presenting at least one selected media content item, the method may include, at 532, again determining the current time and day. When the current time and day determined at 532 is associated with a second set of user media selection settings, the method may include, at 534, selecting subsequent media content items for presentation based on the second set of media selection settings.

Figure 6:
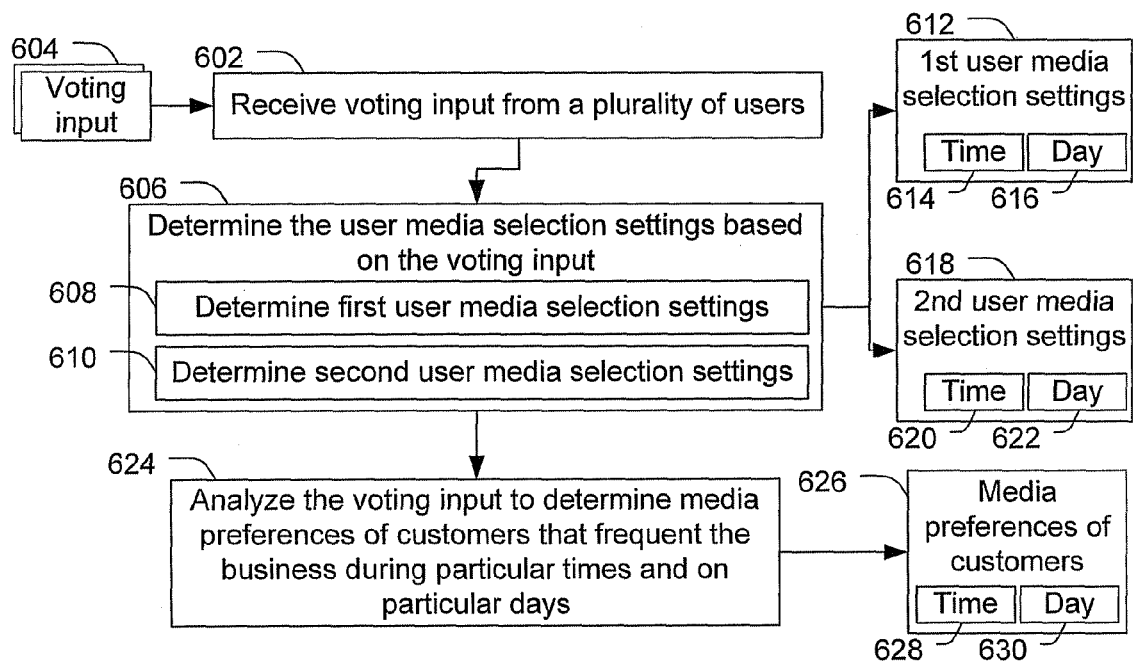
FIG. 6 is a flow chart of a fourth embodiment of a method of selecting media content.

FIG. 6 is a flow chart of a fourth embodiment of a method of selecting media content. The method includes, at 602, receiving voting input 604 from a plurality of users. The voting input 604 may be used, at 606, to determine user media selection settings. For example, the method may include, at 608, determining first user media selection settings 612 and, at 610, determining second user media selection settings 618. The first user media selection settings 612 may be associated with a particular time 614, a particular day 616, or both. The second user media selection settings 618 may be associated with a second particular time 620, a second particular day 622, or both. The user media selection settings 612, 618 may specify proportions of various categories of media content to be presented. In a particular embodiment, either the first user media selection settings 612, the second user media selection settings 618, or other user media selection settings may be used to select media content for presentation based on the time, day or both. In a particular embodiment, the method also includes, at 624, analyzing the voting inputs 604 to determine media preferences of customers that frequent a particular business during particular times, on particular days, or both. For example, the first user media selection settings 612 may be determined based on voting input 604 received during a particular time period, on a particular day, or both. To illustrate, the first user media selection settings 612 may be determined based on votes received from customers of a business between 6 p.m. and 8 p.m. on Monday nights. Likewise, the second user media selection settings 618 may be determined based on voting input 604 received during a second particular time period, on a second particular day, or both. To illustrate, the second user media selection settings 618 may be determined based on votes received from customers of the business between 11 a.m. and 1 p.m. on Fridays. The media preferences of customers 626 may also include other user media selection settings associated with other times 628, other days 630, or both. The user media selection settings may be used to dynamically select media content for presentation at the respective times 614, 620, on the respective days 616, 622, or both. For example, a business may play media content based on the media preference of the customers 626 depending on a current time and a current day.

To illustrate, a particular business, such as a restaurant, a bar, a doctor's office, or any other establishment that desires to provide a media stream to its customers, may subscribe to a streaming media service, such as the streaming media service discussed with reference to FIG. 1. The customers of the particular business may provide the voting input 604. The voting input 604 may reflect the tastes and preferences of the particular customers served by the business. The media streaming service may determine the media selection settings 612, 618 based on the customer provided voting input 604 and may select media content to stream to the business accordingly. Thus, the business may be able to provide media content suited to the tastes of its particular customers. Additionally, if the customer served by the business change over time (e.g., between a set of customers that have lunch at a restaurant and a set of customers that have dinner at the restaurant), the tastes and preferences of each of the different sets of customers can also be accommodated since the voting input 604 may be used to determine user media selection settings 612, 614 that are associated with particular times and/or days.

Figure 7:
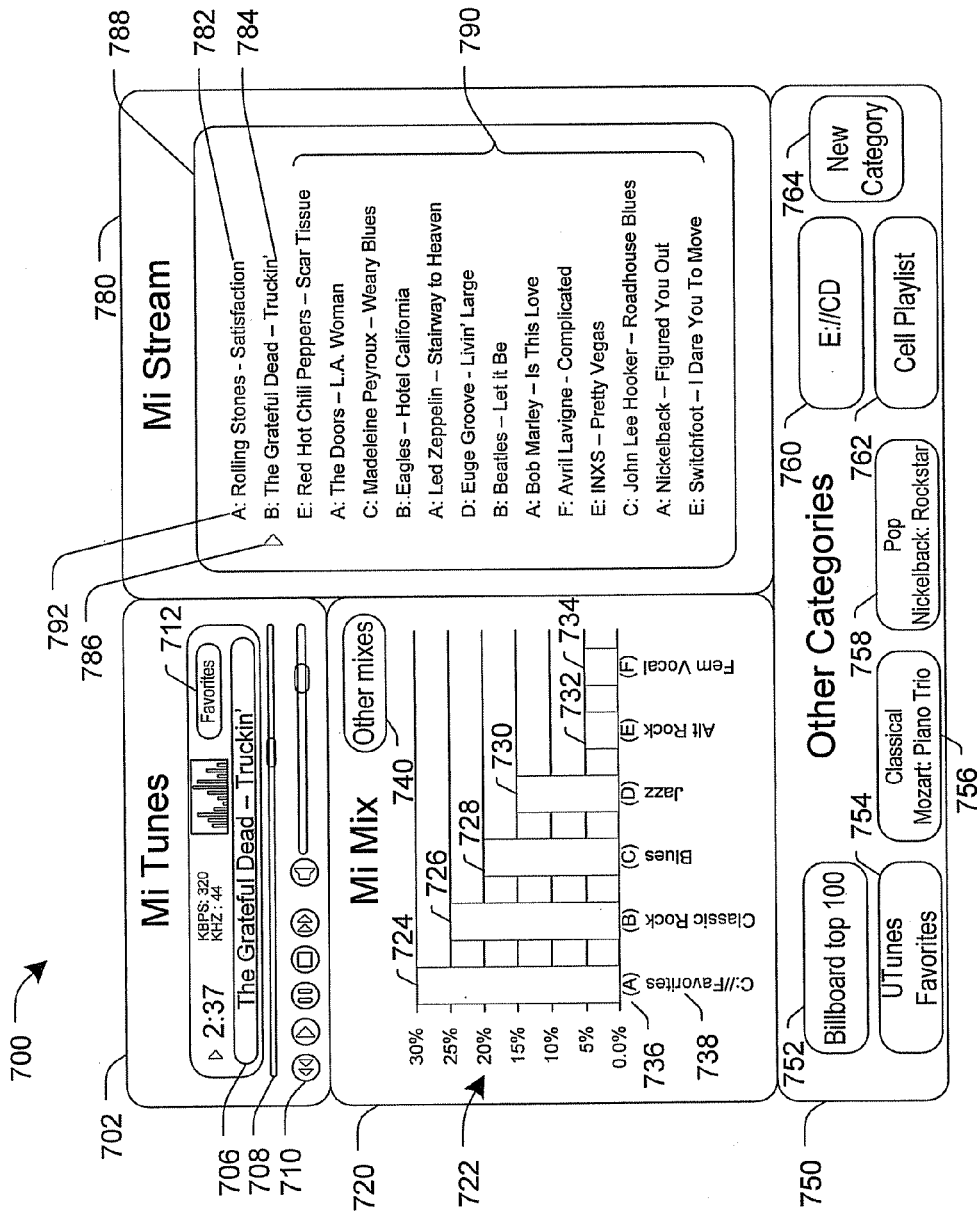
FIG. 7 is an illustration of a first embodiment of a user interface display.

FIG. 7 is an illustration of a first embodiment of a user interface display 700. The user interface display 700 includes a first area 702 associated with a particular media content item being presented. The user interface display 700 also includes a second area 720 associated with media selection settings used to select media content for presentation. The user interface display 700 also includes a third area 750 identifying particular categories of media content not in the media selection settings being used to select media content. The user interface display also includes a fourth area 780 associated with a playlist including one or more media content items that have already been presented, a content item being currently being presented, and one or more subsequent media content items that are yet to be presented.

In a particular embodiment, the first area 702 includes one or more media playback controls 710. For example, the media playback controls 710 may including user selectable options to fast forward, rewind, pause, stop, skip, mute or otherwise control playback of a media content item being presented (i.e., the "current media content item"). The first area 702 may also include a progress bar 708 that provides a visual representation of a time remaining for presentation of the current media content item. The first area 702 may also include a title bar 706 indicating a title, an artist, or other information identifying the current media content item. The first area 702 may also include a favorites user selectable option 712. Selection of the favorites user selectable option 712 may cause the current media content item to be added to a favorites list. Addition of a media content item to the favorites list may cause the particular media content item to be associated with a set of media content items identified as favorites of the user.

In a particular embodiment, the second area 720 includes a graphical representation 722 of the media selection settings being used to select media content for presentation. The particular selection of categories of media content and of the proportions of each of the categories is referred to as a media mix. The graphical representation 722 of the media selection settings illustrated in FIG. 7 may be associated with a first media mix. The second area 720 may also include an other mixes user selectable option 740 which enables the user to select other media mixes which may include other categories of media content, other proportions of the categories, or both.

Each category of media content in the graphical representation 722 may be associated with a title 738 identifying the category. Additionally, each category of media content in the graphical representation 722 may be associated with an indicator 736. The indicator 736 may include a color, a symbol, text, a pattern, another graphical indicator, or any combination thereof. In a particular embodiment, the indicator 736 is a color associated with the particular category of media content. Color codes associated with the categories of media content are not shown in FIG. 7 due to the difficulty of illustrating such color coding; however, in one embodiment, the letter indicators 736 illustrated in FIG. 7 represent color coding in the user interface 700.

The categories of media content in the graphical representation 722 are each associated with a bar or other display object that indicates a proportion of media content to be presented in the media mix. For example, a first bar 724 indicates that a favorites category should make up 25 percent of the media mix. A second bar 726 indicates that a category identified as classic rock should make up 20 percent of the media mix. A third bar 728 indicates that a category identified as blues should make up 15 percent of the media mix. A fourth bar 730 indicated that a category identified as jazz should make up 10 percent of the media mix. A fifth bar 732 indicates that a category identified as alt rock should make up 10 percent of the media mix. A sixth bar 734 indicates that a category identified as fem vocal should make up 5 percent of the media mix. As discussed above, in a particular embodiment, the bars 724-734 are color coded as indicated by the indicators 736 (e.g., indicators (A)-(F)). In a particular embodiment, one or more of the bars 724-734 may include text a particular media content item that is representative of the category of media content, as discussed further with reference to FIG. 13.

The third area 750 includes a plurality of user selectable elements associated with categories of media content that are not in the current media mix. The other categories of media content represented in the third area 750 may include one or more user defined categories (e.g., a playlist associated with a mobile telephone, such as cell playlist option 762). The other categories of media content represented in the third area 750 may also include categories associated with available lists of media content. To illustrate, the other categories of media content may include a billboard top 100 option 752 that is associated with a list of most played songs according to a particular organization that tracks such information. The billboard top 100 option 752 may be associated with information, such as a universal resource identifier (URI) or a universal resource locator (URL), that points to a storage location of the list or of media content items identified on the list. In another example of a list, the other categories of media content may include a user favorites list associated with a particular website, service or application, such as "UTunes Favorites" option 754. The UTunes Favorites option 754 may be associated with information that include information to access a favorites list associated with a "UTunes" website, service or application. For example, when UTunes is a website or service, the UTunes Favorites option 754 may be associated with a URI, a URL or another network address to access the favorites list. In another example, UTunes may be a software application on a computing device, such as a desktop computer, and the UTunes Favorites option 754 may be associated with information that points to a favorites list associated with the software application.

The other media categories represented in the third area 750 may also include one or more categories associated with a particular artist or group of artists, a particular genre (e.g., a classical genre 756, or a pop genre 758), or other information intrinsic to the media content. The other media categories may also include one or more categories associated with a particular storage location. For example, the other media categories may include a user selectable option 760 associated with media stored at a particular location, such as a compact disk in disk drive of a computing device.

In a particular embodiment, the third area 750 includes a user selectable new category option 764 that enables a user to create a new category. In response to the user selecting the user selectable new category option 764, a display may be presented that enables the user to specify media content that is to be associated with the new category. The media content may be associated with the new category based on properties that are intrinsic to the media content (e.g., genre, artist, title, release date), properties that are not intrinsic to the media content (e.g., storage location, user specified data), or both. One or more user selectable options in the third area 750 may include an identifier of a representative media content item such as "Mozart: Piano Trio" in "Classical" user selectable option 756.

The fourth area 780 may include a list 788 of media content items. The list 788 of media content items may list previously presented media content items 790, and the current media content item 784. In a particular embodiment, the list 788 of media content items also lists one or more media content items that are yet to be presented (such as pending item 782). The current media content item 784 may be associated with indicator 786, such as an arrow, to allow a user to quickly identify the current media content item 784 within the list 788. In a particular embodiment, each of the media content items in the list 788 may be associated with an indicator 792. The indicators 792 in the fourth area 780 may be associated with the indicators 736 in the second area 720 to identify the particular category of media content that is associated with each media content item. For example, a "Rolling Stones—Satisfaction" media content item (i.e., the pending item 782) in the list 788 is associated with an indicator (A) which indicates that the "Rolling Stones—Satisfaction" media content item was selected from the "favorites category" associated with the first bar 724 in the second area 720. Similarly, the current media content item 784 is identified as "The Grateful Dead—Truckin" and is associated with an indicator (B) which indicates that the "The Grateful Dead—Truckin" media content item was selected from the "classic rock" category associated with the second bar 726 in the second area 720.

As discussed above, the indicators 736 of the second area 720 may be color codes. Likewise, the indicators 786 of the fourth area 780 may be color codes. Thus, each of the bars 724-734 may be presented in a particular color. The media content items in the list 788 may be color coded in the same manner, such that media content items selected from a particular category are color coded in the same manner as the bar related to the particular category. To illustrate, the second bar 726 associated with the "classic rock" category may be color coded blue, and the current media content item 784 in the list 788 may be color coded blue because the current media content item 784 was selected from the "classic rock" category.

Figures 8, 9, 10:
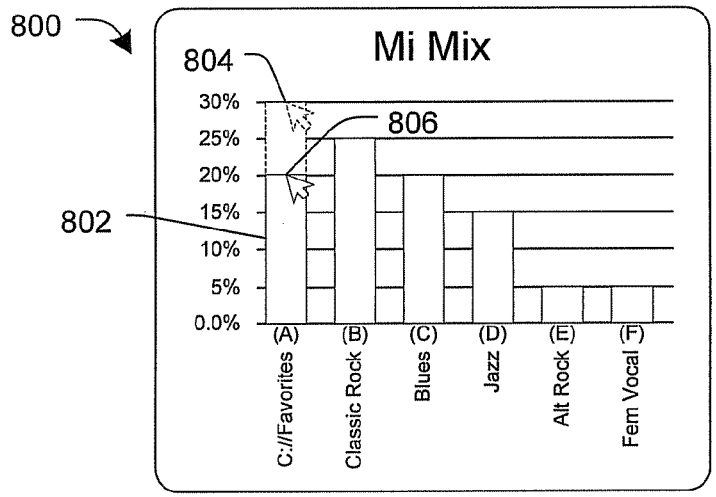
FIG. 8 is an illustration of a second embodiment of a user interface display.
FIG. 9 is an illustration of a third embodiment of a user interface display.
FIG. 10 is an illustration of a fourth embodiment of a user interface display.

FIG. 8 is an illustration of a second embodiment of a user interface display 800. The user interface display 800 illustrates a particular embodiment of a graphical display representing a particular user media selection setting. For example, the user interface display 800 may include information regarding proportions of particular categories of media content to be presented according to a particular media mix.

In a particular embodiment, a user can adjust the proportions of the categories of media content in the media mix by interacting with the user interface display 800. For example, the user may adjust a dimension of a first bar 802 to modify the proportion of the favorites media content category in the media mix. To illustrate, the user may select the first bar 802 and adjust the first bar 802 from a first dimension 804 to a second dimension 806. The first dimension 804 indicates that the favorites media content category should make up 30% of the media mix. The second dimension 806 indicates that the favorites media content category should make up 20% of the media mix. In response to the user input changing the dimension of the first bar 802, media selection settings of the media mix may be adjusted. For example, the proportion of the media content presented that is associated with the favorites category may be adjusted from 30% to 20%. In a particular embodiment, as discussed further with reference to FIGS. 9 and 10, the proportion of one or more other categories of media content in the media mix may also be adjusted based on the adjustment of the dimension of the first bar 802.

FIG. 9 depicts a third particular embodiment of a user interface display 900. FIG. 9 depicts a particular embodiment of a manner in which the user interface display 900 may be modified in response to the user input adjusting the dimension of the first bar 802 of FIG. 8. Based on changing the dimension from the first dimension 804 to the second dimension 806 in FIG. 8, the favorites category associated with the first bar 802 has been adjusted to indicate a 20% proportion of the media mix. The user interface display 900 has also been ordered so that the categories of media content are arranged from the largest proportion of the media mix on the left to smallest proportion of the media mix on the right. Thus, the first bar 802 has moved from the left most position in FIG. 8, to a third from the left position in FIG. 9. Additionally, bars associated with other categories of media content have been adjusted to ensure that 100% of media mix is accounted for.

In FIG. 9, the 10% reduction in the favorites category has been evenly distributed across each of the other categories of media content in the media mix. For example, since six categories of media content are represented in the media mix and one of the categories (the favorites category) has been adjusted to a specified value (i.e., by reducing its proportion from 30% to 20%), 10% of the media mix is divided among the other five categories (categories associated with bars 810, 812, 814, 816 and 818). Thus, each of the other five categories has been increased by 2%. To illustrate, the classic rock category associated with the bar 810 has been adjusted from 25% to 27%; the blues category associated with the bar 812 has been adjusted from 20% to 22%; the jazz category associated with the bar 814 has been adjusted from 15% to 17%; the alt rock category associated with the bar 816 has been adjusted from 5% to 7%; and the fem vocal category associated with bar 818 has been adjusted from 5% to 7%.

FIG. 10 depicts a fourth particular embodiment of user interface display 1000. FIG. 10 depicts a second particular embodiment of a manner in which the user interface display 800 of FIG. 8 may be modified in response to the user input adjusting the dimension of the first bar 802. The user interface display 1000 has been ordered so that the categories of media content are arranged from the large proportion of the media mix on the left to smallest proportion of the media mix on the right. The first bar 802 associated with the favorites category has been adjusted to the new dimension indicating that media mix should include 20% of media content selected from the favorites category. Additionally, the other categories of media content (represented by the bars 810-818) have been adjusted to insure that 100% of media mix is accounted for. In the embodiment illustrated in FIG. 10, the other categories of media content have been adjusted using Equation 1.

$$NP = CP - D*(CP/T) \quad \text{(Equation 1)}$$

In Equation 1, NP is a new percentage value for a particular category being evaluated; CP is the current percentage value for the particular category being evaluated (that is, the percentage value before the user input to change one of the categories was received); D is a total number of percentage points to be distributed among all of the categories except the one changed by the user; and T is the sum of the percentage values of all of the categories before the change excluding the category changed by the user.

To illustrate, referring to FIG. 8, the first bar 802 associated with the favorites category reduced by ten percentage points from 30% to 20%. Thus, D, the total number of percentage points to be distributed among all of the categories except the one changed by the user, is −10% (negative since the favorites category was decreased). Before the user input was received, the favorites category was 30% of the media mix, thus, T, the sum of the percentage values of all of the categories before the change excluding the category changed by the user, is 70% (i.e., 100% minus 30%). Before the user input was received, the classic rock category was 25% of the media mix. Thus, for the classic rock category, CP is 25%. Filling in the values of T, CP and D and solving of NP, the new percentage value of the media mix for the category being evaluated, the classic rock category is approximately 28.6%. Following a similar methodology for the other categories of media content, the blues category associated with the bar 812 may be adjusted from 20% to approximately 22.8%, the jazz category associated with the bar 814 may be adjusted from 15% to approximately 17.1%, the alt rock category associated with bar 816 may be adjusted from 5% to approximately 5.7%, and the fem vocal category associated with bar 818 may be adjusted from 5 percent to approximately 5.7%.

In various embodiments, the new percentage values for the categories may be rounded off. For example, the values associated with categories that represent a larger portion of the media mix may be rounded up to a next percent, next five percent, next ten percent, or another value. After rounding off the values of categories that are a larger portion of the media mix, a category or categories that represent a smaller portion of the media mix may be determined by subtracting the other portions of the media content from 100%. To illustrate, rounding up the values of the categories associated with larger proportions to the next percent, the classic rock category becomes 29%, the blues category becomes 23%, and the jazz category becomes 18%. The sum of these categories and the favorites category is 90%. The remaining 10% may be divided between the two remaining smallest categories leaving each at 5%.

In a particular embodiment, the media mix, the media player, or another setting specifies a minimum proportion that may be associated with a category of media content. For example, the minimum proportion may be 1%, 5% or some other value (e.g., a user specified value). If a change in a proportion of a first category causes another category to drop below the minimum, the category that drops below the minimum may be removed from the media mix. The proportions of one or more of the other categories may be adjusted to ensure that 100% of the media mix is accounted for. For example, one of the methods of adjusting the other categories described with respect to FIGS. 9 and 10 may be used.

Figure 11:
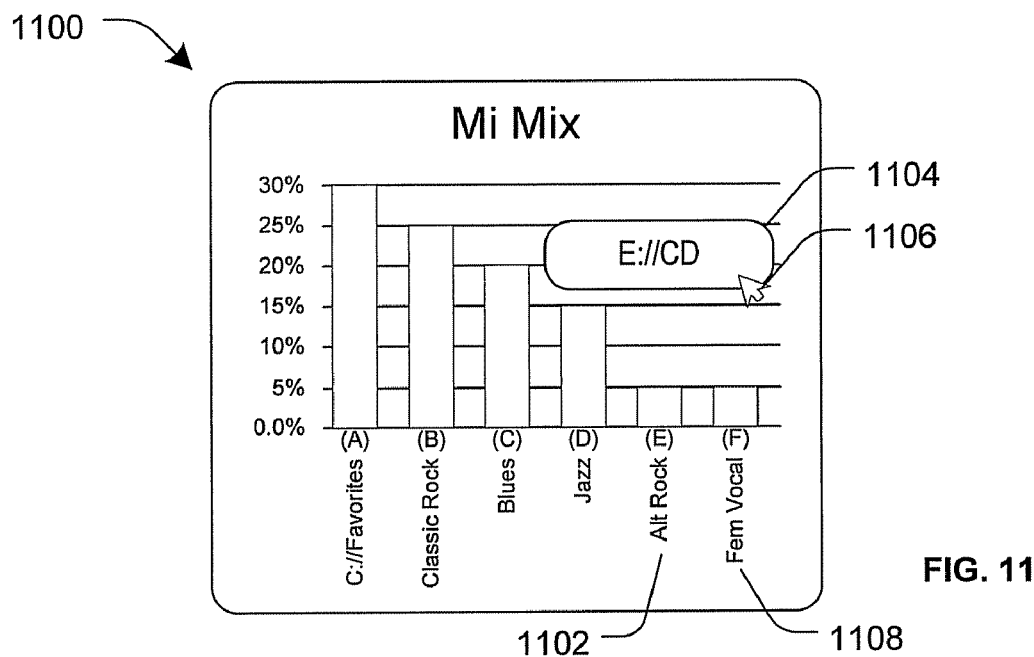
FIG. 11 is an illustration of a fifth embodiment of a user interface display.

FIG. 11 illustrates a fifth particular embodiment of a user interface display 1100. The user interface display 1100 includes a plurality of categories of media content associated with a graphical user interface. For simplicity of discussion, the categories of media content and their proportions are the same as in FIG. 8. The user interface display 1100 also includes a user selectable option 1104 associated with a category of media content that is not present in the media mix. In a particular embodiment, a user may use a cursor 1106 to select the user selectable option 1104 and drag the user selectable option 1104 to an area of the user interface display 1100 that is associated with the media mix. In response to dragging and dropping the user selectable option 1104 to the area associated with the media mix, the category of media content associated with the user selectable option 1104 ("E://CD" in the embodiment illustrated) may be added to the media mix. For example, the media mix may be adjusted to include a default proportion of the category of media content associated with the user selectable option 1104. In another example, the user may be prompted to specify a proportion of the category of media content to be added to the media mix.

Figure 12:
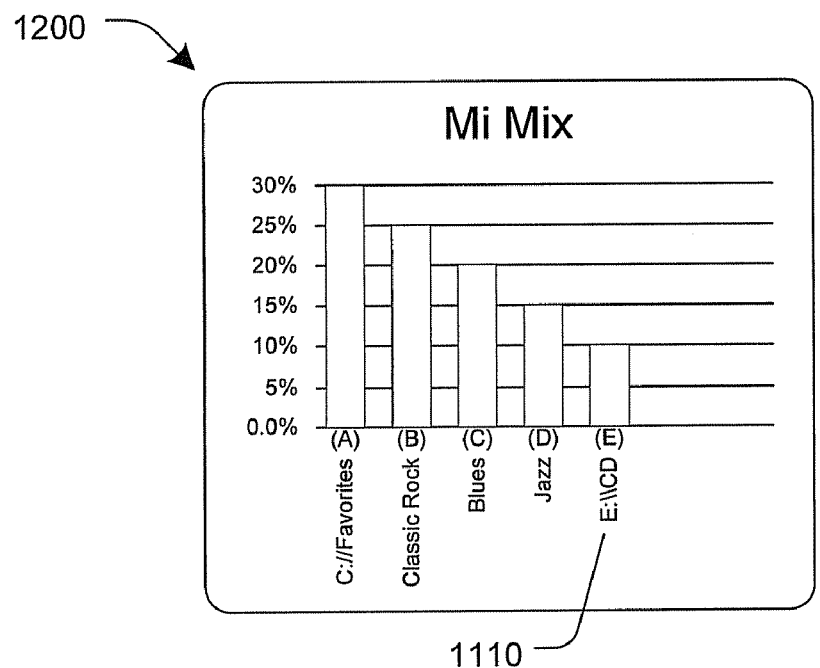
FIG. 12 is an illustration of a sixth embodiment of a user interface display.

FIG. 12 illustrates a sixth particular embodiment of a user interface display 1200. As illustrated in FIG. 12, the media category associated with the user selectable option 1104 (in FIG. 11) has been added to the media mix as a new category 1110. The proportions of other categories of the media mix have been adjusted to accommodate the new category 1110. In particular, 10% of the new category 1110 has been added to the media mix. Modifications to the media mix have been determined by applying a 5% minimum percentage to categories in the media mix. Thus, categories that fall below 5% are dropped from the media mix. As illustrated in FIG. 11, before adding the new category 1110, an alt rock category 1102 and a fem vocal category 1108 each represented 5% of the media mix. When 10% of the new category 1110 was added to the media mix, the 10% was deducted from each category in the media mix by one of the methods discussed with reference to FIGS. 9 and 10. Thus, the fem vocal category 1108 dropped below 5% and was removed from the mix. With the fem vocal category 1108 removed, the 5% previously occupied by the fem vocal category 1108 was available to offset the 10% of the new category 1110. However, since a small amount was still deducted from the alt rock category 1102, it too fell below the 5% minimum and was removed from the media mix. Thus, the entire 10% of the new category 1110 was offset by removing the two smallest categories 1102, 1108 from the media mix, and the proportions of the other categories of media content remain unchanged.

Figure 13:
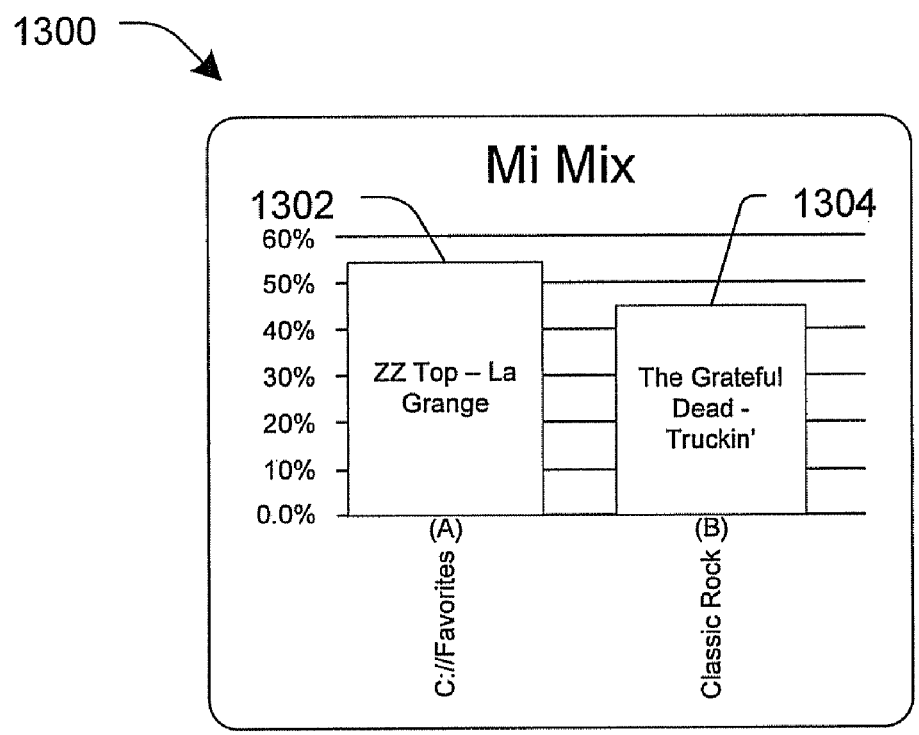
FIG. 13 is an illustration of a seventh embodiment of a user interface display.

FIG. 13 depicts a seventh particular embodiment of a user interface display 1300. As discussed above, the user interface display 1300 may include a plurality of bars 1302 and 1304, each associated with a particular category of media content. As illustrated in FIG. 13, a first bar 1302 is associated with a favorites category and a second bar 1304 is associated with a classic rock category. In a particular embodiment, at least one of the bars 1302, 1304 may include an identifier of a representative media content item associated with the respective category of media content. For example, the first bar 1302, associated with the favorites category, may identify a representative content item, "ZZ TOP—La Grange". For a user defined category such as the favorites category, the representative media content item may be specified by the user, selected based on an analysis of the categories or favorites, selected at random from the user defined category, selected based on user play history information, or any combination thereof. In another example, the second bar 1304, associated with the classic rock category, may identify a representative content item. "The Grateful Dead—Truckin". The representative content item associated with a non-user defined category, such as the classic rock category, may be specified by the user, selected based on an analysis of the category, selected at random from the category, selected based on user play history information, selected based on ratings, popularity or other information associated with the category, or any combination thereof.

Figure 14:
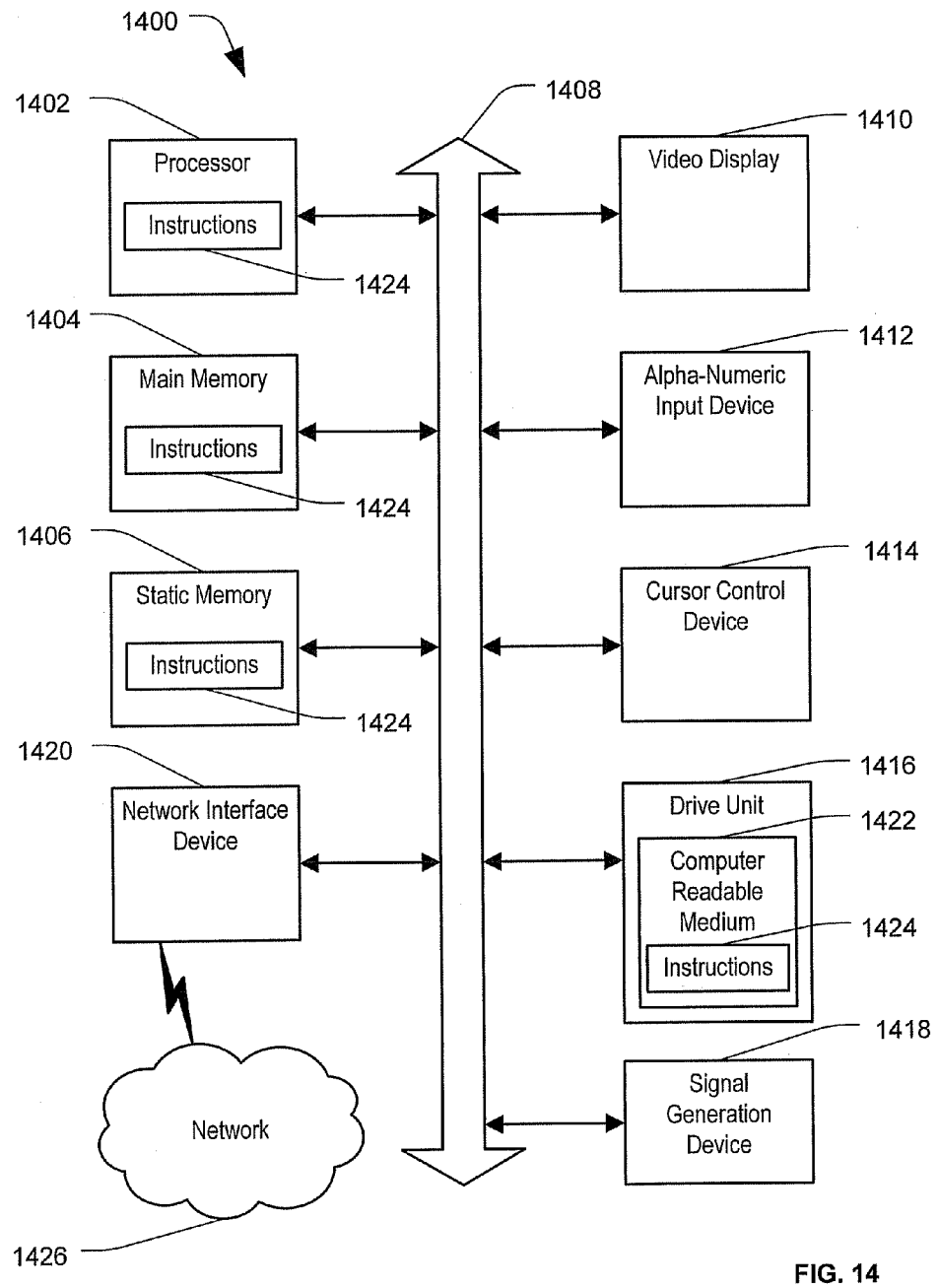
FIG. 14 is a block diagram of a general computer system.

Referring to FIG. 14, an illustrative embodiment of a general computer system is shown and is designated 1400. The computer system 1400 can include a set of instructions that can be executed to cause the computer system 1400 to perform any one or more of the methods or computer based functions disclosed herein. The computer system 1400 may operate as a standalone device or may be connected, e.g., using a network, to other computer systems or peripheral devices. For example, the computer system 1400 may include or be included within any one or more of the media player devices, the remote network devices, the local devices, or other devices discussed with reference to FIGS. 1 and 2.

In a networked deployment, the computer system may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1400 can be implemented using electronic devices that provide audio, voice, video or data communication. Further, while a single computer system 1400 is illustrated, the term "system" shall also be taken to include any collection of systems or subsystems that individually or jointly execute a set, or multiple sets, of instructions to perform one or more computer functions.

As illustrated in FIG. 14, the computer system 1400 may include a processor 1402, e.g., a central processing unit (CPU), a graphics processing unit (GPU), or both. Moreover, the computer system 1400 can include a main memory 1404 and a static memory 1406, that can communicate with each other via a bus 1408. As shown, the computer system 1400 may further include a video display unit 1410, such as a liquid crystal display (LCD), an organic light emitting diode (OLED), a flat panel display, a solid state display, or a cathode ray tube (CRT). Additionally, the computer system 1400 may include an input device 1412, such as a keyboard, and a cursor control device 1414, such as a mouse or remote control. The computer system 1400 can also include a disk drive unit 1416, a signal generation device 1418, such as a speaker, and a network interface device 1420.

In a particular embodiment, as depicted in FIG. 14, the disk drive unit 1416 may include a computer-readable medium 1422 in which data and/or one or more sets of instructions 1424, e.g. software, can be embedded. Further, the instructions 1424 may embody one or more of the methods or logic as described herein. In a particular embodiment, the data and/or instructions 1424 may reside completely, or at least partially, within the main memory 1404, the static memory 1406, and/or within the processor 1402 during execution by the computer system 1400. The main memory 1404 and the processor 1402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1424 or receives and executes instructions 1424 responsive to a propagated signal, so that a device connected to a network 1426 can communicate audio, voice, video or data over the network 1426. Further, the instructions 1424 may be transmitted or received over the network 1426 via the network interface device 1420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
generating a media playlist based on user preference data, wherein the user preference data indicates proportions of each of a plurality of categories of media content to be present in the media playlist;
generating a user interface display, wherein the user interface display presents the user preference data using a plurality of adjustable bars, each adjustable bar associated with one of the plurality of categories of media content, wherein a dimension of each of the plurality of adjustable bars is associated with a proportion of a respective category of media content included in the media playlist;
receiving first user input adjusting a dimension of a first adjustable bar of the plurality of adjustable bars, wherein the first adjustable bar is associated with a first category of media content of the plurality of categories of media content;

adjusting a proportion of the first category of media content included in the media playlist based on the first user input;

in response to determining that a proportion of a second category of media content included in the media playlist is below a threshold, removing the second category of media content from the media playlist; and adjusting the proportion of the first category of media content included in the media playlist and a proportion of at least a third category of media content included in the media playlist to generate a modified media playlist after removing the second category of media content from the media playlist.

2. The method of claim 1, wherein the plurality of categories of media content includes at least one user defined category.

3. The method of claim 2, wherein particular media content is associated with the at least one user defined category based on a property that is not intrinsic to the particular media content.

4. The method of claim 2, wherein particular media content is associated with the at least one user defined category based on a storage location of the particular media content.

5. The method of claim 2, wherein particular media content associated with the at least one user defined category includes a plurality of otherwise unrelated user selected content items.

6. The method of claim 2, wherein particular media content associated with the at least one user defined category includes media content items associated with a universal resource identifier.

7. The method of claim 1, wherein adjusting the proportion of the first category of media content included in the media playlist includes adjusting a percentage of the first category of media content included in the media playlist and adjusting a percentage of at least the second category of media content included in the media playlist.

8. The method of claim 1, wherein the user interface display includes a category list including data identifying a fourth category of media content, wherein the fourth category of media content is not included in the media playlist, and wherein the method further comprises:

receiving second user input selecting and dragging the data identifying the fourth category of media content to a portion of the user interface display including the plurality of adjustable bars; and in response to the second user input, adding the fourth category of media content to the media playlist.

9. The method of claim 1, wherein an output generated based on the modified media playlist includes a first media content item selected based on the modified media playlist and wherein the user interface display includes a visual indicator identifying that the first media content item is associated with a particular category of media content.

10. The method of claim 1, wherein at least one bar of the plurality of adjustable bars has a name identifying a representative media content item, wherein the representative media content item is from a category of media content associated with the at least one bar.

11. A system comprising:
a processor;
a media selection module executable by the processor to generate a media playlist based on user preference data, wherein the user preference data indicates proportions of each of a plurality of categories of media content to be included in the media playlist;
a graphical user interface module to present a user interface display including a representation of the user preference data using a plurality of adjustable bars including a first adjustable bar and a second adjustable bar, wherein the first adjustable bar is associated with a first category of media content of the plurality of categories of media content, wherein a dimension of the first adjustable bar is associated with a proportion of the first category of media content included in the media playlist, wherein the second adjustable bar is associated with a second category of media content of the plurality of categories of media content, and wherein a dimension of the second adjustable bar is associated with a proportion of the second category of media content included in the media playlist;
an input interface to receive a first input to adjust the dimension of the first adjustable bar; and
a user settings module to:
adjust the user preference data based on the first input;
in response to determining that a proportion of the second category of media content to be included in a modified media playlist is below a threshold, remove the second category of media content from the media playlist; and
adjust the proportion of the first category of media content to be included in the modified media playlist and a proportion of at least a third category of media content to be included in the modified media playlist to generate the modified media playlist after removing the second category of media content from the media playlist.

12. The system of claim 11, wherein the media selection module generates the media playlist dynamically by selecting one or more subsequent media content items to be presented based on the user preference data while a current media content item is presented.

13. The system of claim 11, wherein the media player is operable to:
determine whether a media content item included in the media playlist is available at a local memory;
access the media content item at the local memory in response to a determination that the media content item is available at the local memory; and
access the media content item via a remote network element in response to a determination that the media content item is not available at the local memory.

14. The system of claim 11, wherein the media selection module and the user settings module are located at a media player device.

15. The system of claim 11, wherein the media selection module and the user settings module are located at a remote network element accessible to a media player device via a network.

16. A non-transitory computer-readable storage medium storing processor-executable instructions that, when executed by a processor, cause the processor to:
generate a media playlist based on user preference data, wherein the user preference data indicates proportions of each of a plurality of categories of media content to be included in the media playlist;
generate a user interface display, wherein the user interface display presents the user preference data using a plurality of adjustable bars including a first adjustable bar and a second adjustable bar, wherein the first adjustable bar is associated with a first category of media content of the plurality of categories of media content, wherein a dimension of the first adjustable bar is associated with a proportion of the first category of media content included in the media playlist, wherein the second adjustable bar is associated with a second category of media content of the plurality of categories of media content, and wherein a dimension of the second adjustable bar is associated with a proportion of the second category of media content included in the media playlist;

adjust the proportion of the first category of media content to be included in a modified media playlist based on received first user input to adjust the dimension of the first adjustable bar;

in response to determining that thea proportion of the second category of media content to be included in the modified media playlist is below a threshold, remove the second category of media content from the media playlist; and adjust the proportion of the first category of media content to be included in the modified media playlist and a proportion of at least a third category of media content to be included in the modified media playlist to generate the modified media playlist after removing the second category of media content from the media playlist.

17. The method of claim 1, further comprising receiving third user input that identifies a time period when the modified media playlist is to be output.

18. The method of claim 17, wherein the time period includes a particular day.

19. The method of claim 17, further comprising generating an output based on the modified media playlist during the identified time period.

20. The method of claim 8, further comprising:
prompting a user for a fourth user input associated with a proportion of the fourth category of media content to be included in the media playlist; and
adjusting the proportion of the first category of media content included in the media playlist in response to the fourth user input.

21. A method comprising:
generating a media playlist based on user preference data, wherein the user preference data indicates proportions of each of a plurality of categories of media content to be included in the media playlist;
generating a user interface display, wherein the user interface display presents the user preference data using a plurality of adjustable bars including a first adjustable bar and a second adjustable bar, wherein the first adjustable bar is associated with a first category of media content of the plurality of categories of media content, wherein a dimension of the first adjustable bar is associated with a proportion of the first category of media content included in the media playlist, wherein the second adjustable bar is associated with a second category of media content of the plurality of categories of media content, and wherein a dimension of the second adjustable bar is associated with a proportion of the second category of media content included in the media playlist;
receiving first user input adjusting the dimension of the first adjustable bar;
adjusting the proportion of the first category of media content to be included in a modified media playlist based on the first user input;
in response to determining that a proportion of the second category of media content to be included in the modified media playlist is below a threshold, removing the second category of media content from the media playlist; and
adjusting the proportion of the first category of media content to be included in the modified media playlist and a proportion of at least a third category of media content to be included in the modified media playlist to generate the modified media playlist after removing the second category of media content from the media playlist.

* * * * *